United States Patent
Nartker et al.

(10) Patent No.: US 10,102,674 B2
(45) Date of Patent: Oct. 16, 2018

(54) VIRTUAL REALITY HEADSET CONNECTED TO A MOBILE COMPUTING DEVICE

(71) Applicant: Google Inc., Mountain View, CA (US)

(72) Inventors: Andrew Nartker, San Francisco, CA (US); Clayton Woodward Bavor, Jr., Atherton, CA (US); Alexander James Faaborg, Mountain View, CA (US); Glen Murphy, Palo Alto, CA (US); Andrey Doronichev, San Francisco, CA (US); Christian Plagemann, Palo Alto, CA (US); Shiqi Chen, Mountain View, CA (US); Jon Michael Wiley, San Jose, CA (US); Manuel Christian Clement, Felton, CA (US); Murphy Stein, Redwood City, CA (US); Samuel Mark Matson, East Palo Alto, CA (US)

(73) Assignee: Google LLC, Mountain View, CA (US)

( * ) Notice: Subject to any disclaimer, the term of this patent is extended or adjusted under 35 U.S.C. 154(b) by 164 days.

(21) Appl. No.: 15/052,054

(22) Filed: Feb. 24, 2016

(65) Prior Publication Data

US 2016/0267712 A1  Sep. 15, 2016

Related U.S. Application Data

(60) Provisional application No. 62/130,602, filed on Mar. 9, 2015.

(51) Int. Cl.
| | |
|---|---|
| *G06T 19/00* | (2011.01) |
| *A63F 13/00* | (2014.01) |
| *G06F 3/01* | (2006.01) |
| *H04B 1/3827* | (2015.01) |
| *G02B 27/01* | (2006.01) |

(52) U.S. Cl.
CPC ............ *G06T 19/006* (2013.01); *A63F 13/00* (2013.01); *G06F 3/011* (2013.01); *G06F 3/012* (2013.01);
(Continued)

(58) Field of Classification Search
CPC .................................................. G06T 19/006
See application file for complete search history.

(56) References Cited

U.S. PATENT DOCUMENTS

| | | | |
|---|---|---|---|
| 7,215,322 B2 | 5/2007 | Genc et al. | |
| 7,564,469 B2 | 7/2009 | Cohen | |

(Continued)

FOREIGN PATENT DOCUMENTS

| | | |
|---|---|---|
| WO | 2014199154 A1 | 12/2014 |
| WO | 2016/144560 A1 | 9/2016 |

OTHER PUBLICATIONS iPhone 4, Jul. 19, 2010, Wikipedia from Internet Archive, https://web.archive.org/web/20100719192815/https://en.wikipedia.org/wiki/IPhone_4, pp. 1-14.*

(Continued)

*Primary Examiner* — Jeffery A Brier
(74) *Attorney, Agent, or Firm* — Brake Hughes Bellermann LLP

(57) ABSTRACT

In one general aspect, a system for providing a virtual reality (VR) space can include a mobile computing device, and a VR headset operatively coupled to the mobile computing device and including a screen. The mobile computing device can be configured to execute a VR application, and provide content for display on the screen of the VR headset in the VR space.

17 Claims, 19 Drawing Sheets

(52) U.S. Cl.
CPC ......... *H04B 1/3833* (2013.01); *G02B 27/017* (2013.01); *G02B 2027/014* (2013.01); *G02B 2027/0138* (2013.01); *G02B 2027/0187* (2013.01)

(56) References Cited

U.S. PATENT DOCUMENTS

| | | | |
|---|---|---|---|
| 7,636,900 | B2 | 12/2009 | Xia |
| 8,814,702 | B2 | 8/2014 | Rodriguez Machado et al. |
| 2001/0046228 | A1 | 11/2001 | Tahtinen et al. |
| 2004/0092311 | A1* | 5/2004 | Weston ............... A63F 13/10 463/42 |
| 2004/0106504 | A1 | 6/2004 | Reiffel |
| 2006/0017654 | A1 | 1/2006 | Romo |
| 2007/0243863 | A1 | 10/2007 | Hong et al. |
| 2009/0046140 | A1 | 2/2009 | Lashmet et al. |
| 2010/0013860 | A1* | 1/2010 | Mandella ............ G01B 21/04 345/650 |
| 2010/0039377 | A1 | 2/2010 | Lewis et al. |
| 2010/0079356 | A1 | 4/2010 | Hoellwarth |
| 2010/0171680 | A1 | 7/2010 | Lapidot et al. |
| 2011/0070935 | A1 | 3/2011 | Beggs |
| 2011/0169928 | A1* | 7/2011 | Gassel ............... H04N 13/044 348/53 |
| 2011/0175849 | A1* | 7/2011 | Ko ...................... G06F 3/0428 345/175 |
| 2011/0217962 | A1 | 9/2011 | Leung |
| 2011/0254860 | A1 | 10/2011 | Zontrop et al. |
| 2012/0038670 | A1 | 2/2012 | Choi et al. |
| 2013/0002545 | A1 | 1/2013 | Heinrich et al. |
| 2013/0073637 | A1 | 3/2013 | Kim |
| 2013/0127725 | A1 | 5/2013 | Sugimoto |
| 2013/0147686 | A1 | 6/2013 | Clavin et al. |
| 2013/0196757 | A1 | 8/2013 | Latta et al. |
| 2013/0241920 | A1 | 9/2013 | Yang |
| 2014/0043211 | A1 | 2/2014 | Park |
| 2014/0059458 | A1 | 2/2014 | Levien et al. |
| 2014/0104156 | A1 | 4/2014 | Touma et al. |
| 2014/0111544 | A1 | 4/2014 | Hammond |
| 2014/0139439 | A1* | 5/2014 | Park ................... G06F 3/04886 345/169 |
| 2014/0160002 | A1 | 6/2014 | Dent |
| 2014/0168261 | A1 | 6/2014 | Margolis et al. |
| 2014/0221090 | A1 | 8/2014 | Mutschler et al. |
| 2014/0313294 | A1* | 10/2014 | Hoffman ............. G06F 3/0425 348/47 |
| 2014/0362110 | A1 | 12/2014 | Stafford |
| 2015/0054734 | A1 | 2/2015 | Raghoebardajal et al. |

OTHER PUBLICATIONS

Tomasz Mazuryk and Michael Gervautz, Virtual Reality-History, Applications, Technology and Future, Dec. 1999, ResearchGate, Article uploaded by Tomasz Mazuryk on Jan. 12, 2014, pp. 1-72.*
"Using Your Thought-Controlled iPhone to Dial Home", h+ Magazine, available online at <http://hplusmagazine.com/2010/04/12/usingyourthoughtcontrollediphonedialhome/>, Apr. 12, 2010, 5 pages.
"Virtual Reality: Input devices. Technologies for the Direct Interaction", available online at <http://www.cs.upc.edu/~virtual/RVA/Course%20Slides/03.%20VR%20Input%20Hardware.pdf>, 2012/2013, 86 pages.
Althoff et al., "Robust Multimodal Hand—and Head Gesture Recognition for Controlling Automotive Infotainment Systems", BMW Group Research and Technology, Nov. 21, 2005, 11 pages.
Aseeri et al., "Poster: Virtual Reality Interaction using Mobile Devices", abstract available online at <http://ieeexplore.ieee.org/xpl/login.jsp?tp=&arnumber=6550211&url=http%3A%2F%2Fieeexplore.ieee.org%2Fxpls%2Fabs_all.jsp%3Farnumber%3D6550211>, Mar. 2013, retrieved on Oct. 6, 2014, 1 page.
Aseeri, Sahar A., "Virtual Reality Interaction Using Mobile Devices", available online at <http://repository.kaust.edu.sa/kaust/handle/10754/297381>, Jul. 2013, 76 pages.
Azuma, Ronald T., "A Survey of Augmented Reality", In Presence: Teleoperators and Virtual Environments, vol. 6, No. 4, Aug. 1997, pp. 355-385, 48 pages.
Chen et al., "Manually Locating Physical and Virtual Reality Objects", available online at <http://connection.ebscohost.com/c/articles/97562574/manuallylocatingphysicalvirtualrealityobjects>, Sep. 2014, 35 pages.
Chuah et al., "Experiences in Using a Smartphone as a Virtual Reality Interaction Device", Virtual Experiences Research Group, University of Florida, 2012, 5 pages.
Cruz-Neira et al., "Surround-Screen Projection-Based Virtual Reality: The Design and Implementation of the CAVE", Proceedings of the 20th annual conference on Computer graphics and interactive techniques (SIGGRAPH), Aug. 1993, 8 pages.
focalprice.com, "Google Cardboard DIY Virtual Reality 3D Glasses for iPhone, Google Nexus 6 & Samsung Mobile Phones", available online at <http://www.focalprice.com/MX0124X/Google_Cardboard_DIY_Virtual_Reality_3D_Glasses_for_iPhone_Google_Nexus_6.html>, retrieved on Jan. 11, 2015, 4 pages.
Kim et al., "Using Keyboards with Head Mounted Displays", Proceedings VRCAI 2004-ACM Siggraph International Conference on Virtual Reality Continuum and its Applications in Industry, 2004, pp. 336-343.
Lifton et al., "Dual Reality: Merging the Real and Virtual", MIT Media Lab, Jul. 2009, 16 pages.
Liu et al., "An Accelerometer-Based Gesture Recognition Algorithm and its Application for 3D Interaction", ComSIS vol. 7, No. 1, Special Issue, Feb. 2010, 12 pages.
Lok, Benjamin, "Introduction to Virtual Environments", available online at <https://www.google.co.in/url?sa=t&rct=j&q=s&source=web&cd=1&cad=rja&uact=8&ved=0CB0QFjAA&url=http%3A%2F%2Fwww.cise.ufl.edu%2F~lok%2Fteaching%2Fhci-f07%2Introduction%2520to%2520VE.opt&ei=AVXYVLyfLoKUuQT8nIIY&usg=AFQjCNELNkXVjY9a9>, 2003, 37 pages.
Mountain et al., "Interacting With Virtual Reality Models on Mobile Devices", 4th International Workshop on HCI in Mobile Guides, 2005, 6 pages.
Mountain et al., "Interacting With Virtual Reality Scenes on Mobile Devices", Proceedings of the 7th international conference on Human computer interaction with mobile devices and services (MobileHCI), Sep. 2005, 1 page.
Musolesi et al., "The Second Life of a Sensor: Integrating Real-world Experience in Virtual Worlds using Mobile Phones", Proceedings of the 5th Workshop on Embedded Sensor Networks, Jun. 2-3, 2008, 5 pages.
Newman et al. "Tracking for Distributed Mixed Reality Environments", Proceedings of IEEE VR 2007 Workshop on Trends and Issues in Tracking for Virtual Environments, Mar. 2007, 4 pages.
Papagiannakis et al., "A Survey of Mobile and Wireless Technologies for Augmented Reality Systems", retrived from http://hdl.handle.net/10945/41253, 2008, 31 pages.
Sixense, "STEM System: The Best Way to Interact with Virtual Worlds", available online at <https://www.kickstarter.com/projects/89577853/stem-system-the-best-way-to-interact-with-virtual>, retrieved on Oct. 6, 2014, 16 pages.
vrase.com, "World Leader in Smartphone Visualization Devices | vrAse", available online at <http://www.vrase.com/>, retrieved on Sep. 22, 2014, 3 pages.
wikipedia.org, "Projection Augmented Model", available online at <http://en.wikipedia.org/wiki/Projection_augmented_model>, retrieved on Sep. 22, 2014, 6 pages.
Winnemoller, Holger, "Practical Gesture Recognition for Controlling Virtual Environments", available online at <http://holgerweb.net/PhD/Research/papers/hons_thesis.pdf>, 1999, pp. 1-77, 83 pages.
International Search Report and Written Opinion for PCT Application No. PCT/US16/19603, dated Jul. 1, 2016, 12 pages.

* cited by examiner

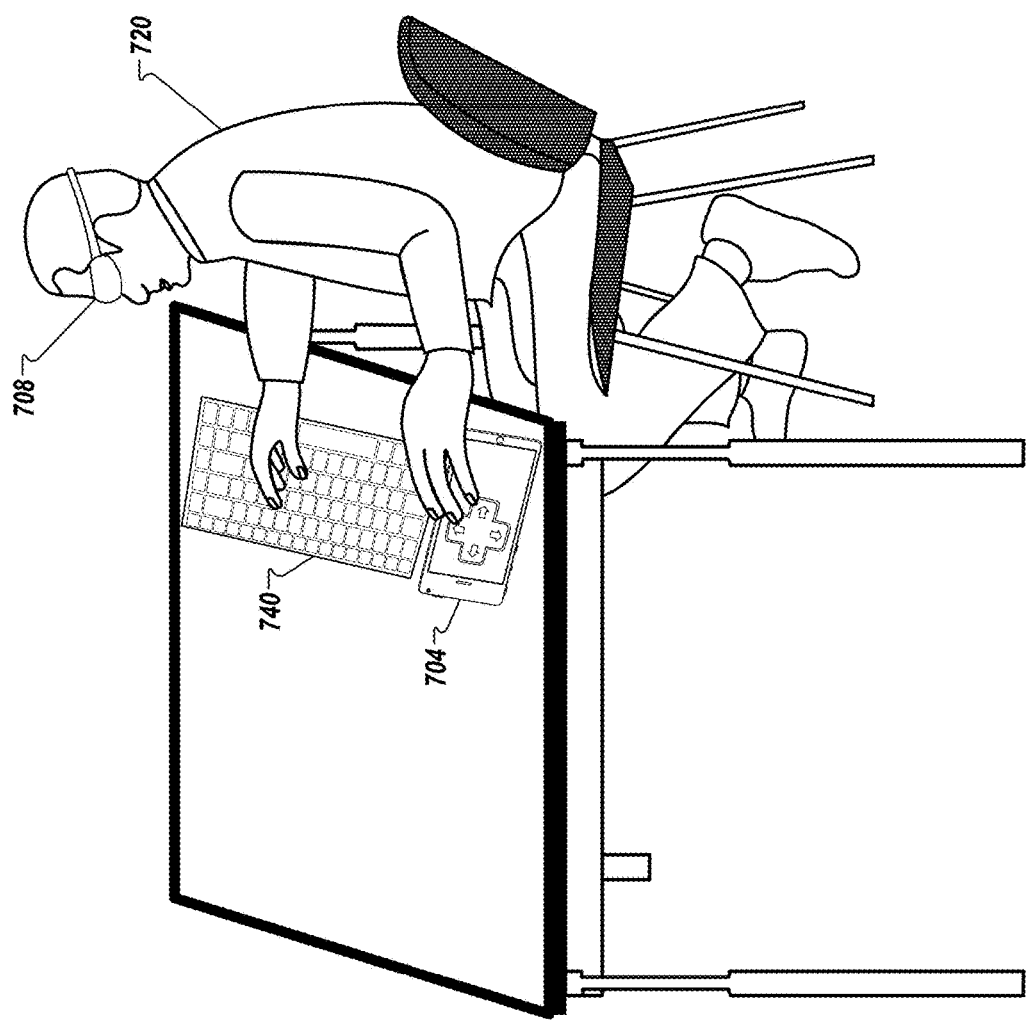

VIRTUAL REALITY HEADSET CONNECTED TO A MOBILE COMPUTING DEVICE

CROSS-REFERENCE TO RELATED APPLICATIONS

This application claims priority under 35 U.S.C. § 119(e)(1), to U.S. Provisional Application Ser. No. 62/130,602, filed on Mar. 9, 2015, the entire contents of which are incorporated herein.

TECHNICAL FIELD

This description generally relates to the use of a mobile computing device in a virtual reality (VR) space.

BACKGROUND

In general, virtual reality can surround and immerse a person in a computer-generated, three-dimensional (3D) environment. The person can enter this environment by interacting with and/or physically wearing specific electronic devices. Example electronic devices can include, but are not limited to, a helmet that includes a screen, glasses or goggles that a user looks through when viewing a screen (e.g., a display device or monitor), gloves fitted with sensors, and external handheld devices that include sensors. Once the person enters the VR space, the person can interact with the 3D environment in a way (e.g., a physical way) that seems real to the person.

SUMMARY

In one general aspect, a system for providing a virtual reality (VR) space can include a mobile computing device, and a VR headset operatively coupled to the mobile computing device and including a screen. The mobile computing device can be configured to execute a VR application, and provide content for display on the screen of the VR headset in the VR space.

Example implementations may include one or more of the following features. For instance, the mobile computing device can be coupled to the VR headset using a tethered wired connection. The tethered wired connection can include a shape sensing cable configured to determine a position of the mobile computing device. The mobile computing device can be coupled to the VR headset using a wireless connection. The VR headset can include another mobile computing device. A display device included in the other mobile computing device included in the VR headset can be the screen. The other computing device can be configured to render the provided content for display on the display device. The VR headset can further include a position detection device configured to determine a position of the mobile computing device. The position detection device can be a camera. The mobile computing device can include a display device. The mobile computing device can be further configured to display a Quick Response (QR) code on the display device. The camera can detect an orientation of a QR code displayed on the display device of the mobile computing device. The position detection device can be an Infrared (IR) sensor configured to detect output from a plurality of IR light emitting diodes (LEDs). The system can further include a case that can accommodate the mobile computing device. The case can include the plurality of IR LEDs. The mobile computing device can be placed in the case. The VR application can determine a position of the mobile computing device based on the detection of the output from the plurality of IR LEDs. The mobile computing device can include a touchscreen. The plurality of IR LEDs can be located behind the touchscreen. The VR application can determine a position of the mobile computing device based on the detection of the output from the plurality of IR LEDs. The plurality of IR LEDs can be embedded within the touchscreen. The VR application can determine a position and orientation of the mobile computing device based on the detection of the output from the plurality of IR LEDs.

In another general aspect, a method for providing a virtual reality (VR) space can include operatively coupling a mobile computing device to a VR headset including a screen, executing, by the mobile computing device, a VR application, and providing, by the mobile computing device, content for display on the screen of the VR headset in the VR space.

Example implementations may include one or more of the following features. For instance, the method can further include rendering an aspect of the mobile computing device for inclusion in the VR space based on a detected position of the mobile computing device, and integrating the rendered aspect of the mobile computing device with the content for display on the screen of the VR headset. The method can further include detecting an interaction of a user with the mobile computing device, and altering the content for display on the screen of the VR headset based on the detected interaction. Providing content for display on the screen of the VR headset in the VR space can include rendering, by the mobile computing device, an aspect of the mobile computing device for inclusion in the VR space, and integrating the rendered aspect of the mobile computing device with content for display as integrated content in the VR space. The rendered aspect of the mobile computing device can be different from content displayed on a display device included in the mobile computing device.

In yet another general aspect, a non-transitory, machine-readable medium has instructions stored thereon. The instructions, when executed by a processor, can cause a mobile computing device to operatively interface with a VR headset coupled to the mobile computing device, the VR headset including a screen, execute a VR application, and provide content for display on the screen of the VR headset in a virtual reality (VR) space.

Example implementations may include one or more of the following features. For instance, the instructions, when executed by the processor, can further cause the mobile computing device to render an aspect of the mobile computing device for inclusion in the VR space based on a detected position of the mobile computing device, and integrate the rendered aspect of the mobile computing device with the content for display on the screen of the VR headset. The instructions, when executed by the processor, can further cause the mobile computing device to detect an interaction of a user with the mobile computing device, and alter the content for display on the screen of the VR headset based on the detected interaction.

The details of one or more implementations are set forth in the accompanying drawings and the description below. Other features will be apparent from the description and drawings, and from the claims.

BRIEF DESCRIPTION OF THE DRAWINGS

FIG. 7B is a diagram that illustrates a user as they are viewing the fourth image on the screen of the VR headset.

Like reference symbols in the various drawings indicate like elements.

DETAILED DESCRIPTION

Figure 1:
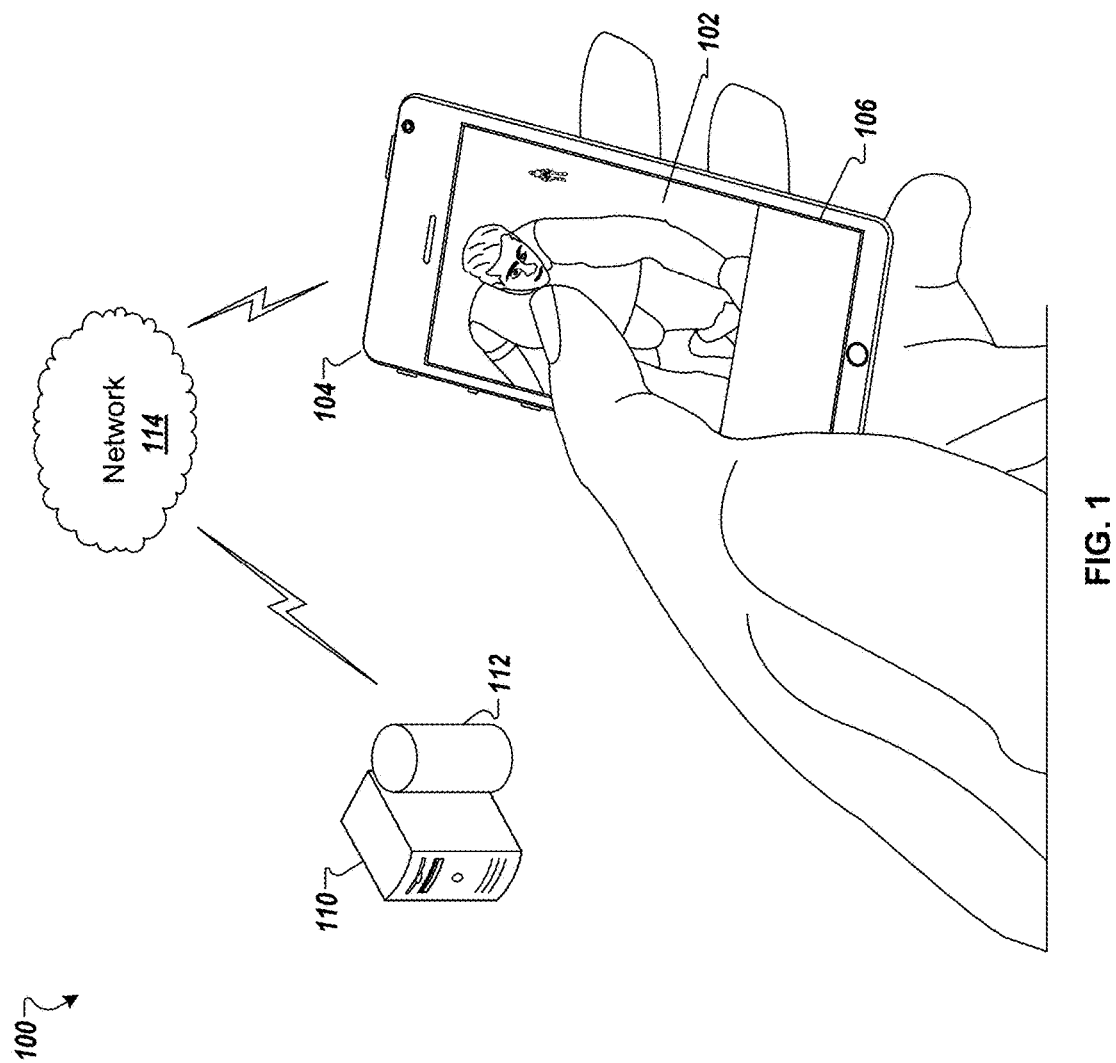
FIG. 1 is a diagram that illustrates a system with a user interacting with content on a mobile computing device.

In some implementations, a user (a person) may want to use one or more computing devices that they may already own and use for other purposes to interface with a computer-generated, 3D environment. Example computing devices can include, but are not limited to, mobile computing devices such as a mobile phone, a tablet, a notebook, or a laptop computer. For example, a user can put on a VR headset or other VR device in order to view (enter) the computer-generated, 3D environment (VR space). In some implementations, the VR device can include a mobile computing device that can execute a VR application. In these implementations, the mobile computing device provides the screen that the user views when interacting with the computer-generated, 3D environment. Non-limiting examples of a VR application can be a movie, a game, or a virtual aerial or street-level tour of a geographic location (e.g., a street-level tour of a city, a tour of a museum).

In some implementations, the mobile computing device can be interfaced to/connected to a VR headset. In some implementations, the mobile computing device can execute a VR application. In these cases, in addition, the mobile computing device may interface with a computer-generated, 3D environment in a VR space. In these implementations, the VR headset includes a screen. In some implementations, the VR headset can connect to/communicate with the mobile computing device using one or more high-speed wired and/or wireless communications protocols (e.g., WiFi, Bluetooth, Bluetooth Low Energy (LE), Universal Serial Bus (USB), USB 3.0, USB Type-C, etc.). In addition, or in the alternative, the VR headset can connect to/communicate with the mobile computing device using an audio/video interface such as High-Definition Multimedia Interface (HDMI). In some implementations, the content displayed to the user on the screen included in the VR headset may also be displayed on a display device that may be included in the mobile computing device. This allows someone else to see what the user may be interacting with in the VR space.

Once the user enters the VR space, the user can interact with the mobile computing device directly in the VR space. In some implementations, the mobile computing device can be used as a controller in the VR space. The controller may be a VR sword, a VR pointing device, a VR launcher, a VR touch keyboard, or some other type of controller relevant to the computer-generated, 3D environment. In some implementations, the mobile computing device may also be used as an interface device relevant to the computer-generated, 3D environment such as a camera or a sword. In these implementations, the user can interact with the mobile computing device in the VR space in a mode of operation relevant to the computer-generated, 3D environment.

One or more sensors included on a mobile computing device can provide input to the VR space. The sensors can include, but are not limited to, a touchscreen, accelerometers, gyroscopes, pressure sensors, biometric sensors, temperature sensors, humidity sensors, and ambient light sensors. The mobile computing device can use the sensors to determine an absolute position and/or to detect a rotation of the mobile computing device that can then be used as input to the VR space. For example, the mobile computing device may be incorporated into the VR space as a laser pointer or sword. Positioning of the mobile computing device by the user when the mobile computing device is incorporated into the VR space can allow the user to position the laser pointer or sword in the VR space.

In some implementations, one or more input devices included on a mobile computing device can be used as input to a VR space. The input devices can include, but are not limited to, a touchscreen, a keyboard, one or more buttons, a trackpad, a touchpad, a pointing device, a mouse, a trackball, a joystick, a camera, and a microphone. A user interacting with an input device included on the mobile computing device when the mobile computing device is incorporated into the VR space can cause a particular action to occur in the VR space. For example, the mobile computing device may be incorporated into the VR space as a missile launcher controller. A user pressing a particular button on the mobile computing device may launch a missile. In another example, a user may be watching a movie in the VR space. Buttons on the mobile computing device may be incorporated into the VR space to control the volume of the audio of the movie.

In some implementations, a touchscreen of the mobile computing device can be rendered as a touchpad in VR space. A user can interact with the touchscreen of the mobile computing device. The interactions can be rendered as movements on the rendered touchpad in the VR space. The rendered movements can control objects in the VR space. In some implementations, when a touchscreen of a mobile computing device is rendered in VR space, one or more controls rendered in the VR space that a user may interact with while touching the touchscreen device may only be rendered/displayed in the VR space and not on the touchscreen of the mobile computing device. For example, the touchscreen of the mobile computing device may be blank, may be in a reduced mode of operation, or may be displaying another real world image (e.g., a tracking image).

In some implementations, one or more output devices included on the mobile computing device can provide output and/or feedback to a user of the mobile computing device in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers. Referring to the example of the mobile computing device incorporated into the VR space as a laser pointer or sword, the mobile computing device can vibrate when the sword makes contact with an object in the VR space. Referring to the example of the mobile computing device incorporated into the VR space as a missile launcher, the mobile computing device may output a sound (e.g., an alarm or chime) and/or blink an LED and/or flash a strobe when a launched missile reaches and destroys a target. In some cases, the blinking LED and/or the flashing strobe may not be viewable by the user in the VR space.

In some implementations, a mobile computing device may appear as another object in a computer-generated, 3D environment. As described in the above examples, the mobile computing device may appear as a laser pointer or sword in a VR space. Interactions by the user with the mobile computing device (e.g., rotating, shaking, touching a touchscreen, swiping a finger across a touch screen) can be interpreted as interactions with the object in the VR space. In the example of the laser pointer or sword in a VR space, the mobile computing device appears as a virtual laser pointer or sword in the computer-generated, 3D environment. As the user manipulates the mobile computing device, the user in the VR space sees movement of the laser pointer or sword. The user receives feedback from interactions with the mobile computing device in the VR environment on the mobile computing device.

In some implementations, a mobile computing device may include a touchscreen. For example, a user can interact with the touchscreen in a particular manner that can mimic what happens on the touchscreen with what happens in the VR space. For example, a user may use a gesture to zoom content displayed on the touchscreen. This gesture motion on the touchscreen can cause information provided in the VR space to be zoomed. In another example, the mobile computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices (e.g., a mouse, a keyboard) in addition to the mobile computing device can be rendered in a computer-generated, 3D environment. The rendered input devices (e.g., the rendered mouse, the rendered keyboard) can be used as rendered in the VR space to control objects in the VR space.

In some implementations, the mobile computing device may be a touch-input controller. The touch-input controller can include a touchscreen and a controller interfaced to the touchscreen that can control the operations of the touchscreen. A user can interact with the touchscreen in a particular manner that can mimic what happens on the touchscreen with what happens in the VR space. In addition, or in the alternative, the touchscreen can be rendered as a touchpad in the VR space. In these cases, user interactions with the touchscreen can be rendered as movements on the rendered touchpad in the VR space.

In some implementations, the mobile computing device may be a touch-input controller that can include one or more input devices, output devices, and/or sensors. The input devices can include, but are not limited to, one or more buttons, a camera, and a microphone. An input device can cause a particular action to occur in a VR space when the mobile computing device is incorporated into the VR space. The output devices can include, but are not limited to, vibration motors, vibration coils, piezoelectric devices, electrostatic devices, light emitting diodes (LEDs), strobes, and speakers. An output device can provide feedback and/or output to a user of the mobile computing device when the mobile computing device is incorporated into the VR space. The feedback and/or output can be visual, tactical, or audio. The sensors can include, but are not limited to, accelerometers, gyroscopes, pressure sensors, biometric sensors, temperature sensors, humidity sensors, and ambient light sensors. A sensor can provide information (e.g., orientation, temperature) about the mobile computing device while the mobile computing device is incorporated into the VR space.

A touch-input controller can provide fewer functions as compared to a mobile phone, a tablet computer, a notebook computer, or a laptop computer. The inclusion of fewer functions can result in a less expensive and, in some cases, a smaller footprint device as compared to, for example, a mobile phone or tablet computer. A touch-input controller may not provide cellular communication functions such as those provided by a mobile phone. A touch-input device may not run (execute) a variety of applications. The VR headset connected to/interfaced with the touch-input controller can run (execute) a VR application on a computing device included in the VR reality headset. In this case, the touch-input controller does not need to run (execute) the VR application.

A mobile computing device can include one or more devices that can be used by the VR headset to track the position and orientation of the mobile computing device. In some implementations, a display device (a display screen) included in the mobile computing device can display one or more Quick Response (QR) codes and/or equivalent markers. In some implementations, infrared light emitting diodes (IR LEDs) can be mounted/included in a case that can accommodate the mobile computing device. The VR headset can track the location and orientation of the mobile computing device while in the case using the IR LEDs. In some implementations, the mobile computing device can be connected to/tethered to a VR headset using a shape sensing cable to tether the mobile computing device to the VR headset. The VR headset can track the location and orientation of the mobile computing device by sensing the shape of the cable that physically connects the mobile computing device to the VR headset. In some implementations, when the mobile computing device includes a touchscreen (e.g., a touch-input controller), IR LEDs (tracking LEDs) can be mounted behind the touchscreen/touch panel as a form of backlighting. The VR headset can track the location and orientation of the mobile computing device using the IR LEDs.

In some implementations, when the mobile computing device includes a touchscreen (e.g., a touch-input controller), IR pixels can be included in/embedded in the touchscreen of the mobile computing device. The VR headset can track the location and orientation of the mobile computing device using the IR pixels included/embedded in the touchscreen.

FIG. 1 is a diagram that illustrates a system 100 with a user interacting with content 102 on a mobile computing device 104. In the example shown in FIG. 1, the user may be watching a movie (the content 102) on a display device 106 included in the mobile computing device 104. In some implementations, one or more content servers (e.g., a content server 110) and one or more computer-readable storage devices (e.g., a content repository 112) can communicate with the mobile computing device 104 using a network 114 to provide the content 102 to the mobile computing device 104. The content 102 can be stored on the mobile computing device 104. For example, the content 102 can be a VR application such as a movie, a game, or a virtual aerial or street-level tour of a geographic location.

In some implementations, the network 114 can be a public communications network (e.g., the Internet, cellular data network, dialup modems over a telephone network) or a private communications network (e.g., private LAN, leased lines). In some implementations, the mobile computing device 104 can communicate with the network 114 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

Figure 2:
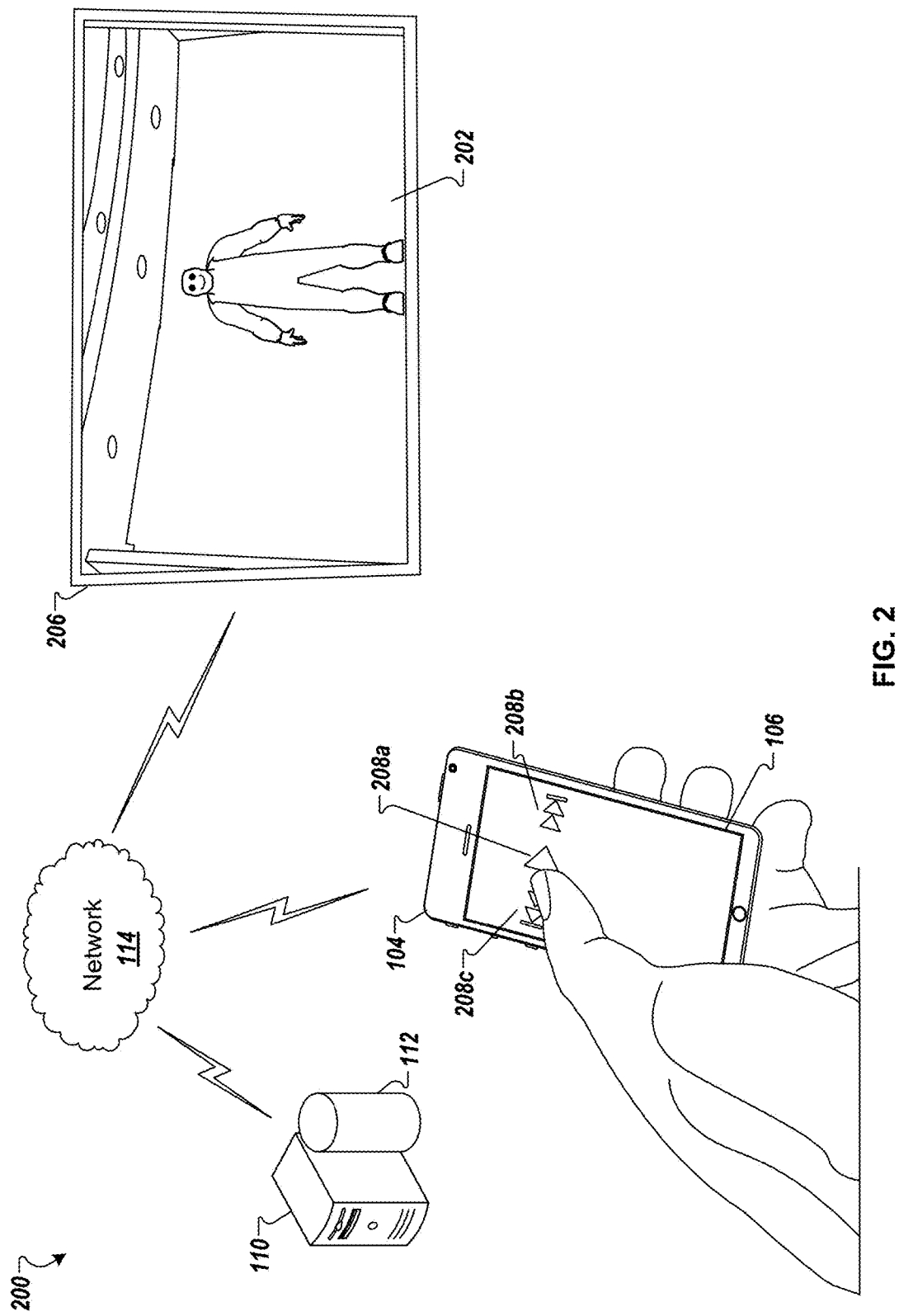
FIG. 2 is a diagram that illustrates a system displaying content on a display device or monitor where a computing device acts a provider of the content and as a controller for the content.

FIG. 2 is a diagram that illustrates a system 200 displaying content 202 on a display device or monitor 206 where a computing device (e.g., the mobile computing device 104) acts as a provider of the content 202 and as a controller for the content 202. In the example shown in FIG. 2, controls 208a-c are displayed on the display device 106 included on the mobile computing device 104. The display device 106 can be a touchscreen.

In some implementations, the mobile computing device 104 can display the content 202 in a tab or page of a web browser application. The web browser application can provide or "cast" the tab or page to a cast-enabled device (e.g., the monitor 206). A cast-enabled device can communicate with a network (e.g., the network 114) using a high-speed wireless protocol such as WiFi, Bluetooth, or Bluetooth LE. For example, the web browser application can provide a user interface for initiating and controlling the casting of the tab. The user of the mobile computing device 104 can provide or "cast" the tab for viewing on the monitor 206 by selecting an icon included on the user interface for the web browser application that initiates the casting of the tab. The content 202 can be provided from the content server 110 to the monitor 206 by way of the network 114 by using a high-speed wireless protocol (e.g., WiFi, Bluetooth, Bluetooth LE). The mobile computing device 104 communicates with the content server 110 by way of the network 114 by using a high-speed wireless protocol (e.g., WiFi, Bluetooth, Bluetooth LE) to control the content 202.

In some implementations, a cast-enabled application can display the content on the mobile computing device 104. For example, the cast-enabled application can provide a user interface for initiating and controlling the casting of the tab.

The user of the mobile computing device 104 can provide or "cast" the content for viewing on the monitor 206 by selecting an icon included on the user interface for the cast-enabled application that initiates the casting.

The mobile computing device 104 can act as a controller for the content 202 displayed on the monitor 206. For example, the content 202 can be a movie and a user can touch (contact, tap) a play icon 208a to play the movie, touch (contact, tap) a fast forward icon 208b to fast-forward the movie, and touch (contact, tap) a rewind icon 208c to rewind the movie.

Figure 3A:
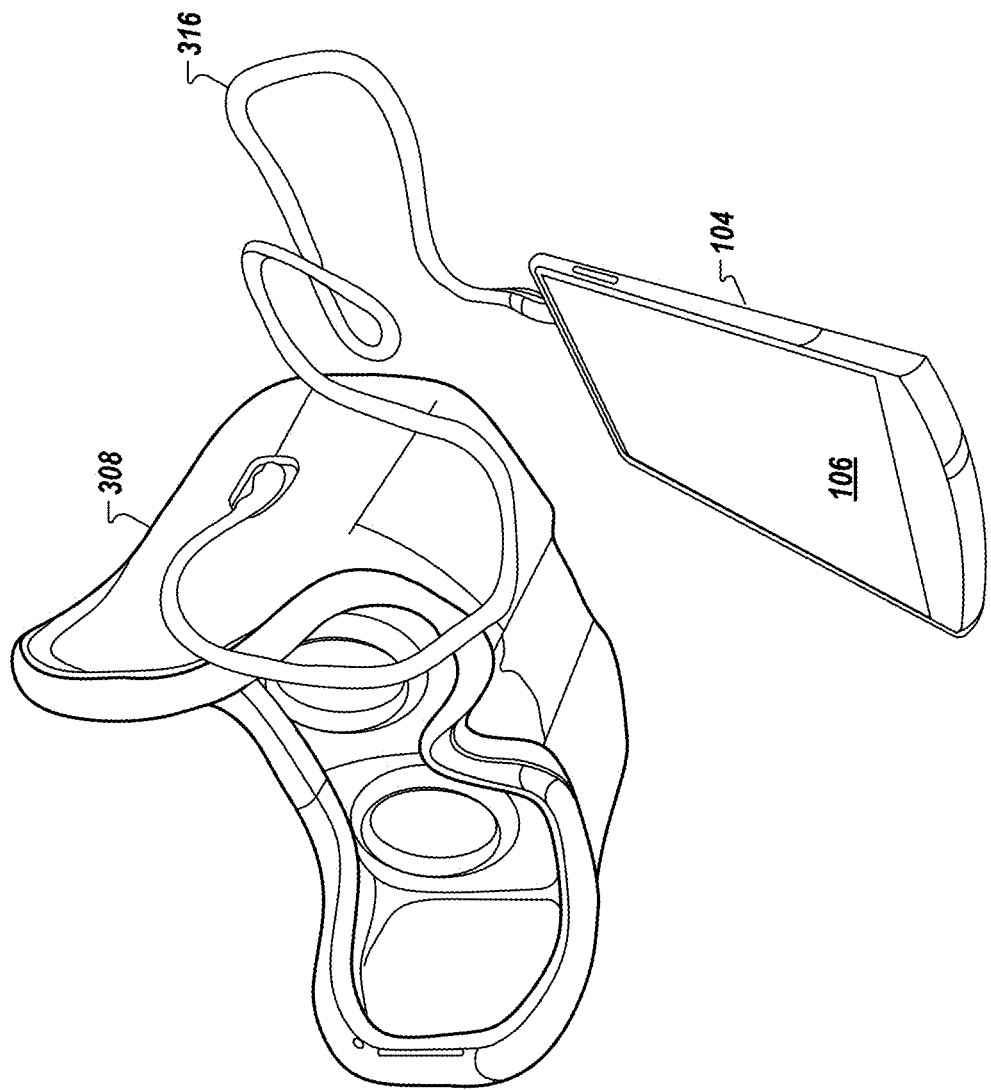
FIG. 3A is a diagram that illustrates connecting a mobile computing device to a VR headset.

FIG. 3A is a diagram that illustrates connecting a mobile computing device (e.g., the mobile computing device 104) to a VR headset 308. In the example shown in FIG. 3, the mobile computing device 104 is connected to the VR headset 308 using a cable 316. The mobile computing device 104 can connect to/communicate with the VR headset 308 using one or more high-speed communication protocols such as, for example, USB 2.0, USB 3.0 and USB 3.1. In some cases, the mobile computing device 104 can connect to/communicate with the VR headset 308 using an audio/video interface such as, for example, High-Definition Multimedia Interface (HDMI). In some cases, the mobile computing device 104 can connect to/communicate with the VR headset 308 using a DisplayPort Alternate mode for a USB Type-C standard interface. The DisplayPort Alternate mode can include a high-speed USB communication interface and DisplayPort functions.

In some implementations, the mobile computing device 104 can connect to the VR headset 308 wirelessly, without the need for a cable (e.g., the cable 316). The mobile computing device 104 can connect to/communicate with the VR headset 308 wirelessly using one or more high-speed communication protocols such as, for example, WiFi, Bluetooth, or Bluetooth LE.

The cable 316 can include an appropriate connector on either end for plugging into the VR headset 308 and the mobile computing device 104. For example, the cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors.

Non-limiting examples of a VR application can be a movie, a game, or a virtual aerial or street-level tour of a geographic location (e.g., a street-level tour of a city). In some implementations, the VR headset 308 can include circuitry (e.g., a processor and memory) that can execute a VR application to render/create a computer-generated, 3D environment (a VR space). In these implementations, the mobile computing device 104 can be used as a controller in the VR space. In addition or in the alternative, the mobile computing device 104 can provide input to the VR space and can receive feedback/output from the VR space. In addition or in the alternative, the mobile computing device 104 can appear as an object in the VR space (e.g., a laser pointer, a sword).

In some implementations, the VR headset 308 can include a removable computing device that can execute a VR application. The removable computing device can be similar to the mobile computing device 104. The removable computing device can be incorporated within a casing or frame of a VR headset (e.g., the VR headset 308) that can then be put on by a user of the VR headset 308. In these implementations, the removable computing device can provide a display or screen that the user views when interacting with the computer-generated, 3D environment (a VR space). As described above, the mobile computing device 104 can connect to the VR headset 308 using a wired or wireless interface protocol. The mobile computing device 104 can be a controller in the VR space, can appear as an object in the VR space, can provide input to the VR space, and can receive feedback/output from the VR space.

In some implementations, the mobile computing device 104 can execute a VR application and can provide data to the VR headset 308 for the creation of the VR space. In some implementations, the content for the VR space that is displayed to the user on a screen included in the VR headset 308 may also be displayed on a display device 106 included in the mobile computing device 104. This allows someone else to see what the user may be interacting with in the VR space.

The VR headset 308 can provide information and data indicative of a position and orientation of the mobile computing device 104. The VR application can receive and use the position and orientation data as indicative of user interactions within the VR space.

Figure 3B:
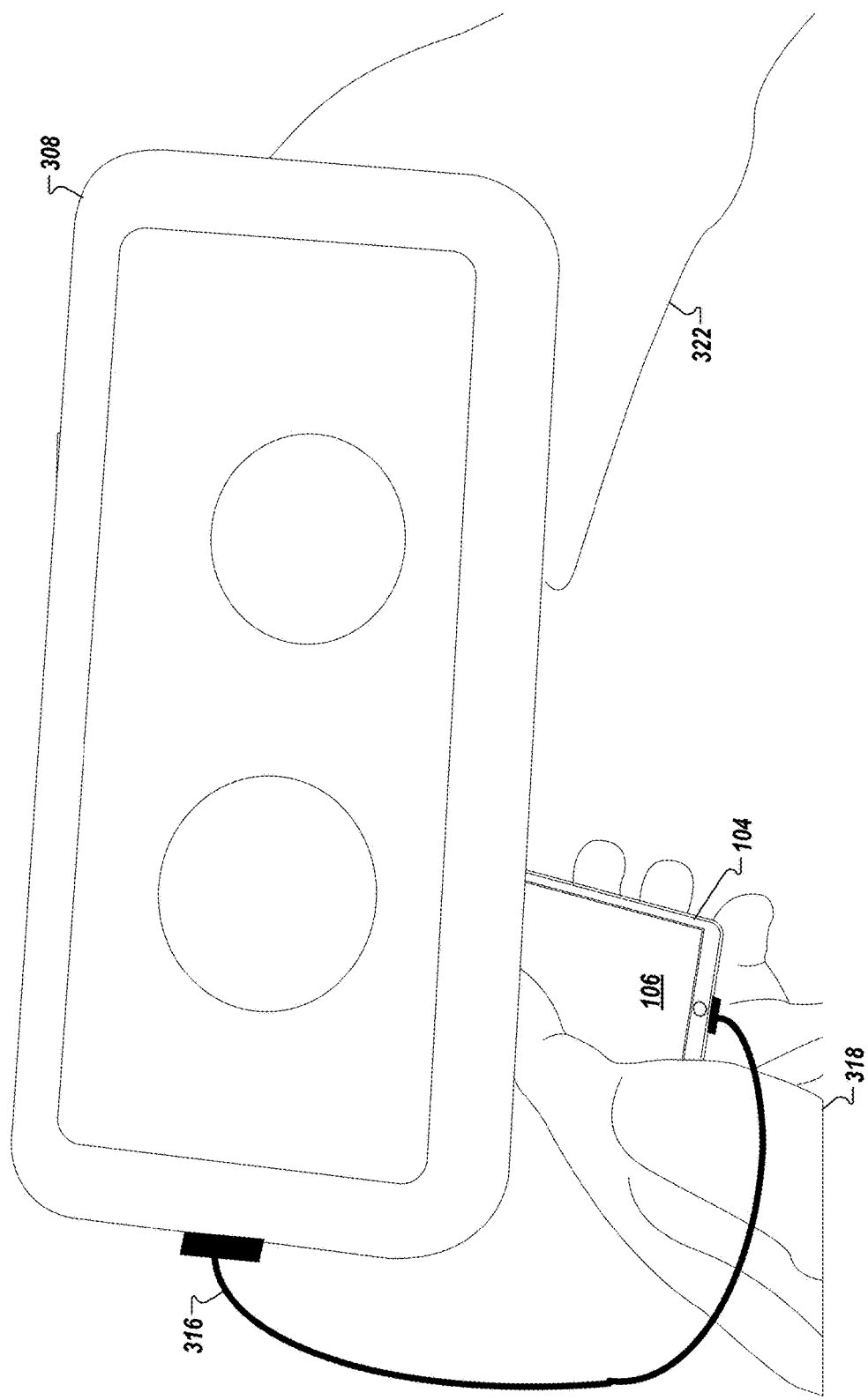
FIG. 3B is a diagram that illustrates a user holding a VR headset as they prepare to put on the VR headset.

FIG. 3B is a diagram that illustrates a user holding a VR headset or VR device (e.g., the VR headset 308) as they prepare to put on the VR headset. A user can put on the VR headset 308 by placing the VR headset 308 over the eyes of the user. The VR headset 308 and the mobile computing device 104 are connected as shown in FIG. 3A (using the cable 316). As described with reference to FIGS. 1, 2, and 3A, in some implementations, the VR headset 308 can interface with/connect to the mobile computing device 104 using a high-speed wireless communication interface.

In some implementations, the mobile computing device 104 can execute a VR application that can provide content (e.g., the content 202) to the VR headset 308 for a computer-generated, 3D environment (a VR space). The mobile computing device 104 can recognize the interface to the VR headset 308 and, in response, can execute the VR application that renders an aspect of a user (e.g., a hand of a user) and the mobile computing device 104 in a computer-generated, 3D environment (a VR space) that includes the content 202. For example, the mobile computing device 104 can recognize or identify the VR headset 308 when one end of the cable 316 is plugged into the VR headset 308 and the other end of the cable 316 is plugged into the mobile computing device 104. In another example, where the VR headset 308 can interface with/connect to the mobile computing device 104 using a high-speed wireless communication interface, the mobile computing device 104 can identify or discover the VR headset 308 using a high-speed wireless communication protocol. The mobile computing device 104 can identify or discover the VR headset 308 when the VR headset 308 and the mobile computing device 104 are within a certain distance from one another (e.g., ten meters, sixty meters).

In the example shown in FIG. 3B, the user can hold the mobile computing device 104 in a left hand 318. The user can hold the VR headset 308 in a right hand 322 while placing it over the eyes of the user. In other cases, the user can hold the mobile computing device 104 in the right hand 322 and can hold the VR headset 308 in the left hand 318.

Figure 3C:
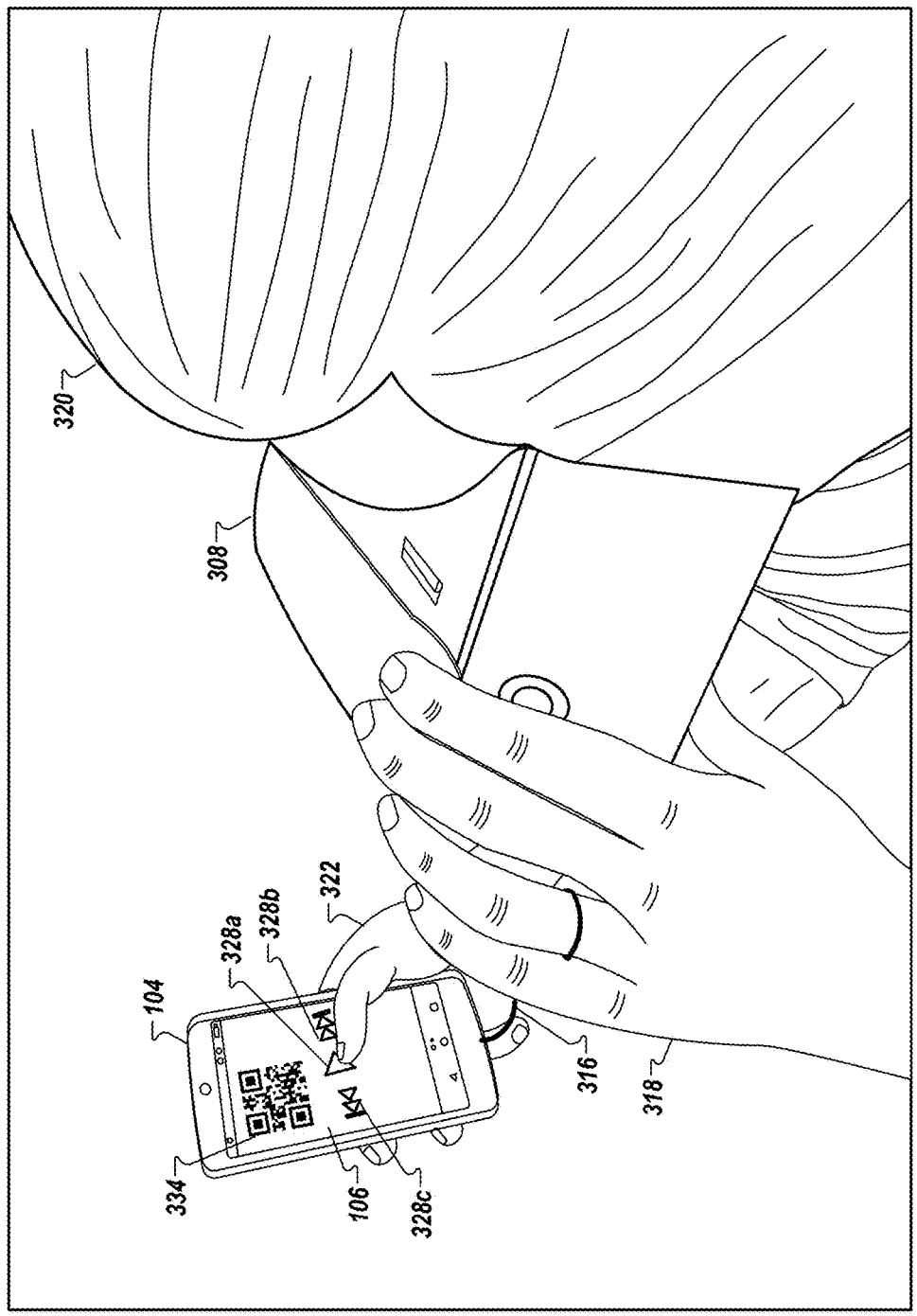
FIG. 3C is a diagram that illustrates a user holding a VR headset over the eyes of the user while holding a mobile computing device in front of the VR headset.

FIG. 3C is a diagram that illustrates a user 320 holding the VR headset 308 over the eyes of the user 320 while holding the mobile computing device 104 in front of the VR headset 308. In the example shown in FIG. 3C, the user 320 is holding the VR headset 308 in the left hand 318 and the user is holding the mobile computing device 104 in the right hand 322. In some cases, the user 420 can hold the VR headset 308 in the right hand 322 and the mobile computing device 104 in the left hand 318.

The VR headset 308 can include hardware and/or software that can recognize, monitor, and track 3D movement of the mobile computing device 104 when the mobile computing device 104 is placed in front of or held within a range of positions relative to the VR headset 308. For example, the positions can include, but are not limited to, positions in front of the VR headset 308, to either side of the VR headset 308, and to positions above and below the VR headset 308. The VR headset 308 can include one or more sensors that can track the 3D movement (the position and orientation) of the mobile computing device 104 in real-time. The VR headset 308 can provide the real-time position and orientation data to the VR application so that the VR application can render the mobile computing device 104 in real-time in the VR space in the detected position and orientation of the mobile computing device 104. In some implementations, the VR headset 308 can provide the real-time position and orientation data to a VR application executing on the VR headset 308. In some implementations, the VR headset 308 can provide the real-time position and orientation data to a VR application executing on the mobile computing device 104.

For example, the VR headset 308 can include a camera that can recognize, monitor, and track 3D movement of the mobile computing device 104 when the mobile computing device 104 is placed in front of or held within a range of positions relative to the VR headset 308. Non-limiting examples of the camera can include a color camera, a monochrome camera, a black and white camera, a 3D depth-sensing camera, a stereo camera, and a time-of-flight (ToF) camera.

As shown in FIG. 3C, in some implementations, the mobile computing device 104 can display one or more markers (e.g., a Quick Response (QR) code 334) on the display device 106 of the mobile computing device 104. The VR headset 308 can include hardware and software to scan the QR code 334. The VR headset 308 can determine a position of the mobile computing device 104 relative to the VR headset 308 by determining a size of the QR code 334. For example, the smaller the size of the QR code 334 the farther away the mobile computing device 104 is placed from the VR headset 308. The VR headset 308 can determine an orientation of the mobile computing device 104 to the VR headset 308 by determining an orientation of the QR code 334.

In some implementations, in cases when the mobile computing device 104 and the VR headset 308 are connected by a cable (e.g., the cable 316 as shown in FIGS. 3A-C), hardware and software included in the VR headset 308 can measure bend and rotation of the cable 316. The measured bend and rotation of the cable 316 can be used to determine the position and orientation of the mobile computing device 104 relative to the VR headset 308. When multiple markers are used, position and orientation of the mobile computing device 104 may be determined based on the relative positions and orientations of the markers.

In some implementations, the VR headset 308 and/or the mobile computing device 104 can include hardware and software for tracking the position and orientation of the mobile computing device 104 using infrared (IR) technology. In some implementations, infrared light emitting diodes (IR LEDs) can be mounted/included in a case that can accommodate the mobile computing device 104. The VR headset 308 can include hardware and software that can track the location and orientation of the mobile computing device 104 while in the case using the IR LEDs. In some implementations, the display device 106 included in the mobile computing device 104 can be a touchscreen. IR LEDs (tracking LEDs) can be mounted behind the touchscreen as a form of backlighting. The VR headset 308 can track the position and orientation of the mobile computing device 104 using the IR LEDs. In some implementations, the display device 106 included in the mobile computing device 104 can be a touchscreen that includes a plurality of IR pixels. The IR pixels can be included/embedded in the touchscreen of the mobile computing device 104. The VR headset 308 can track the position and orientation of the mobile computing device 104 using the IR pixels included/embedded in the touchscreen.

In some implementations, the VR headset 308 and/or the mobile computing device 104 can include hardware and/or software for tracking the position and orientation of the mobile computing device 104 using an ultrasonic tracking system. In some implementations, the VR headset 308 and/or the mobile computing device 104 can include hardware and/or software for tracking the position and orientation of the mobile computing device 104 using a magnetic tracking system.

In some implementations, hardware and/or software used when interfacing the mobile computing device 104 with the VR headset 308 can be included on either or both of the mobile computing device 104 and the VR headset 308.

For example, a VR application executing on the mobile computing device 104 can display controls 328a-c on the display device 106 included on the mobile computing device 104. The VR application can then render the controls 328a-c in a computer-generated, 3D environment (a VR space). In some implementations, the controls 328a-c may be rendered in the VR space and not displayed on the display device 106. In these implementations, the display device 106 may be blank or the display device 106 may display other information. The user 320 can interact with the touchscreen of the mobile computing device 104, interacting with the controls 328a-c on the display device 106, while immersed in the VR space. The VR application can render the in real-time in the VR space causing an action to be performed in the VR space.

In some implementations, the mobile computing device 104 can be rendered as an interface and/or controller in the VR space provided by the VR headset 308. In addition, the mobile computing device 104 can provide content to the VR headset 308 for the VR space.

Figure 4A:
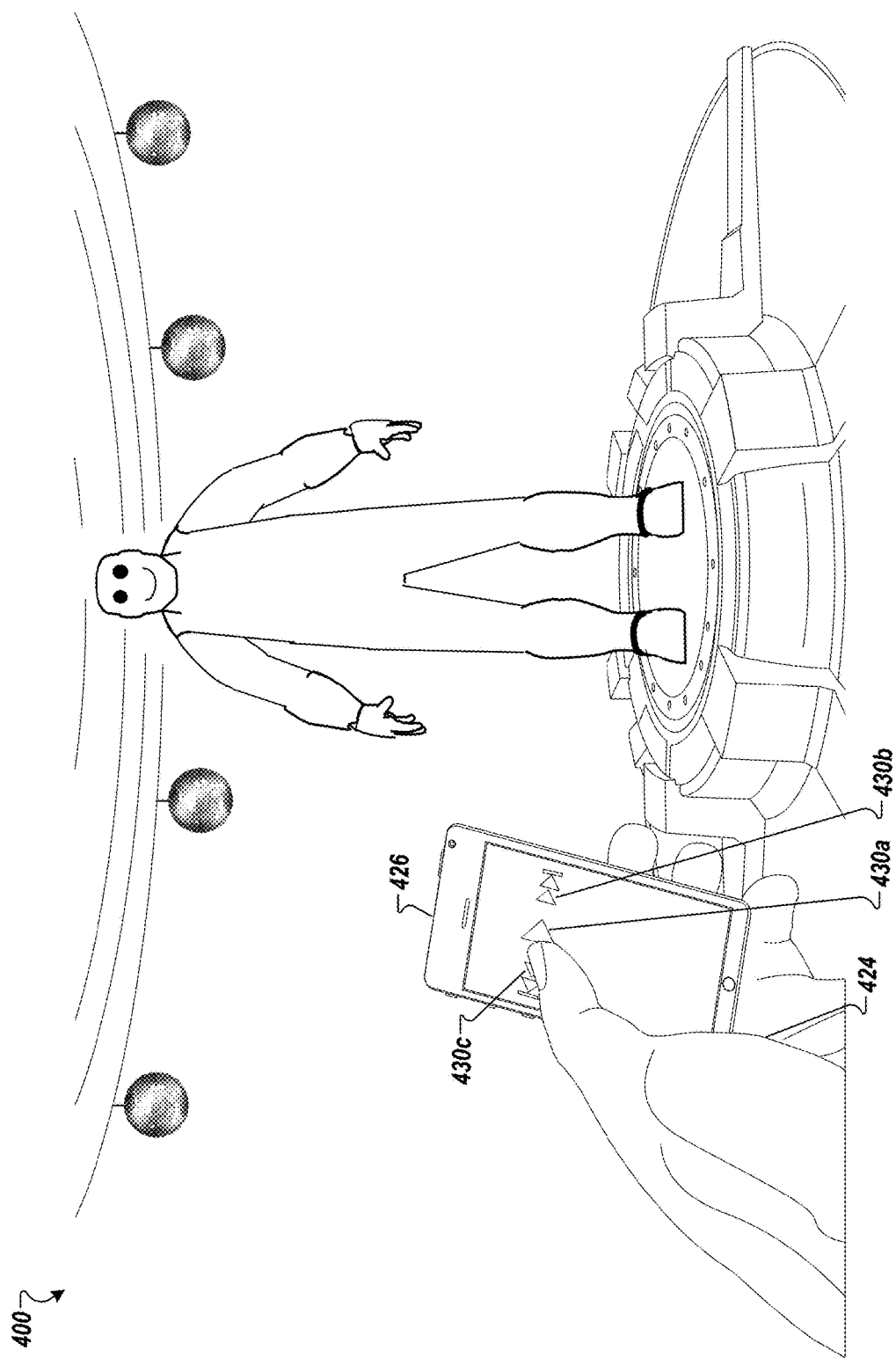
FIG. 4A is a diagram that illustrates a first image that a user can view on a screen of a VR headset.
Figure 4B:
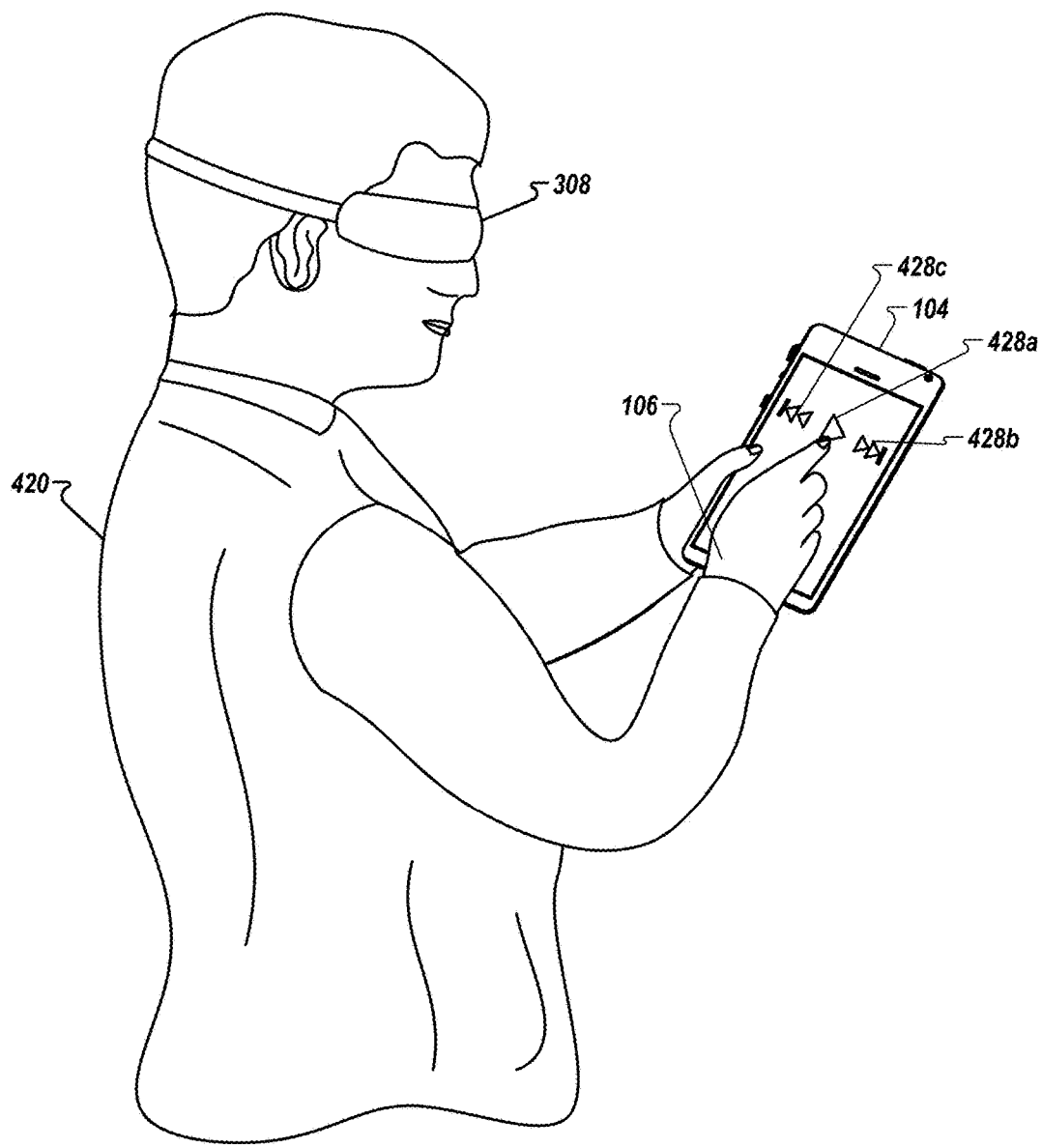
FIG. 4B is a diagram that illustrates a user as they are viewing the first image on the screen of the VR headset.

FIG. 4A is a diagram that illustrates an image 400 that a user can view on a screen of a VR headset (e.g., the VR headset 308 as shown in FIGS. 3A-C). FIG. 4B is a diagram that illustrates a user 420 as they are viewing the image 400 on the screen of a VR headset 308. Referring to FIGS. 1, 2, and 3A-C, the user 420 can view the image 400 that includes the content 202 on the screen of the VR headset 308 while holding the mobile computing device 104. In some implementations, as described herein, the mobile computing device 104 can execute a VR application that can render/create a computer-generated, 3D environment (a VR space). The mobile computing device 104 can provide data representative of the VR space to the VR headset 308. The VR headset 308 can use the data to provide the computer-generated, 3D environment (the VR space) to a user wearing/holding the VR headset 308.

In some cases, a user can hold or place the mobile computing device 104 in front of the VR headset 308 as shown in FIG. 4B. For example, the image 400 projects the user into a VR space. The image 400 includes a rendering 424 of a hand and fingers of the user 420 (e.g., the left hand 318) holding a rendering 426 of the mobile computing device 104 as the user is actually holding the mobile computing device 104 in front of the VR headset 380 as shown in FIG. 4B.

As described herein, the VR headset 308 can include one or more sensors that can track the 3D movement (the position and orientation) of the mobile computing device 104 in real-time. The VR headset 308 can provide the real-time position and orientation data to the VR application so that the VR application can render the mobile computing device 104 in real-time in the VR space in the detected position and orientation of the mobile computing device 104.

The VR application can display controls 428a-c on the display device 106 included on the mobile computing device 104. The VR application can then render the controls 428a-c as rendered controls 430a-c on the rendered computing device 426. For example, the user 420, while projected into the VR space of a movie, can interact with the touchscreen of the mobile computing device 104. The user 420 can touch (contact, tap) a play icon 428a to play the movie. This interaction of the user 420 with the touchscreen of the mobile computing device 104 can be rendered in real-time in the VR space as shown in the image 400.

In some implementations, a touchscreen of the mobile computing device 104 can be rendered as one or more soft buttons in VR space. For example, a user wearing the VR headset 308 can use eye tracking and head position to select an object in the VR space. The mobile computing device 104 rendered as a soft button can be used as a "click" to complete or confirm the selection of the object. The user can touch or tap a touchscreen included in the mobile computing device 104, which is rendered as the user pressing the rendered button in VR space. The user pressing the rendered button performs the "click" or confirmation of the object selection.

Figure 5A:
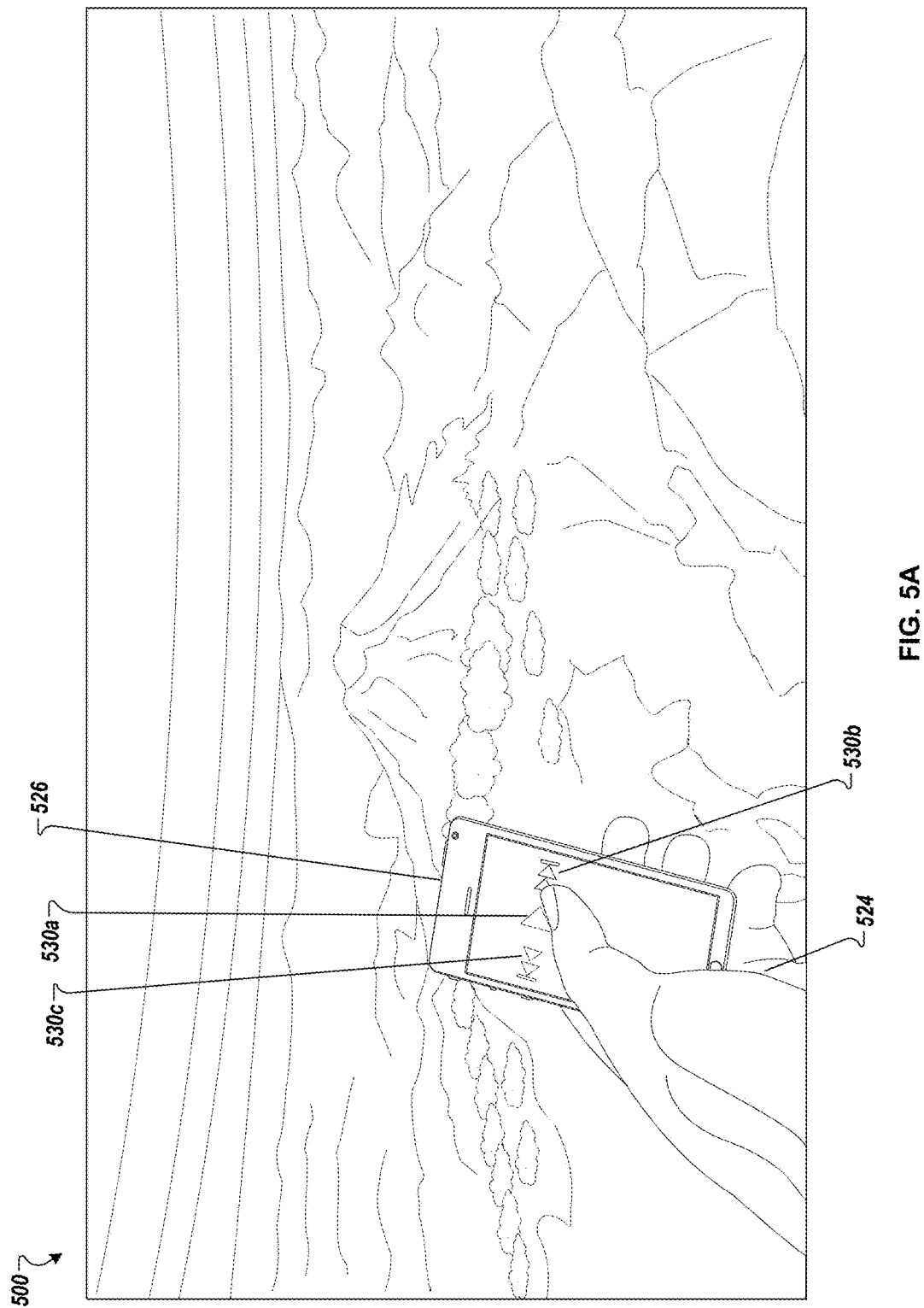
FIG. 5A is a diagram that illustrates a second image that a user can view on a screen of a VR headset.
Figure 5B:
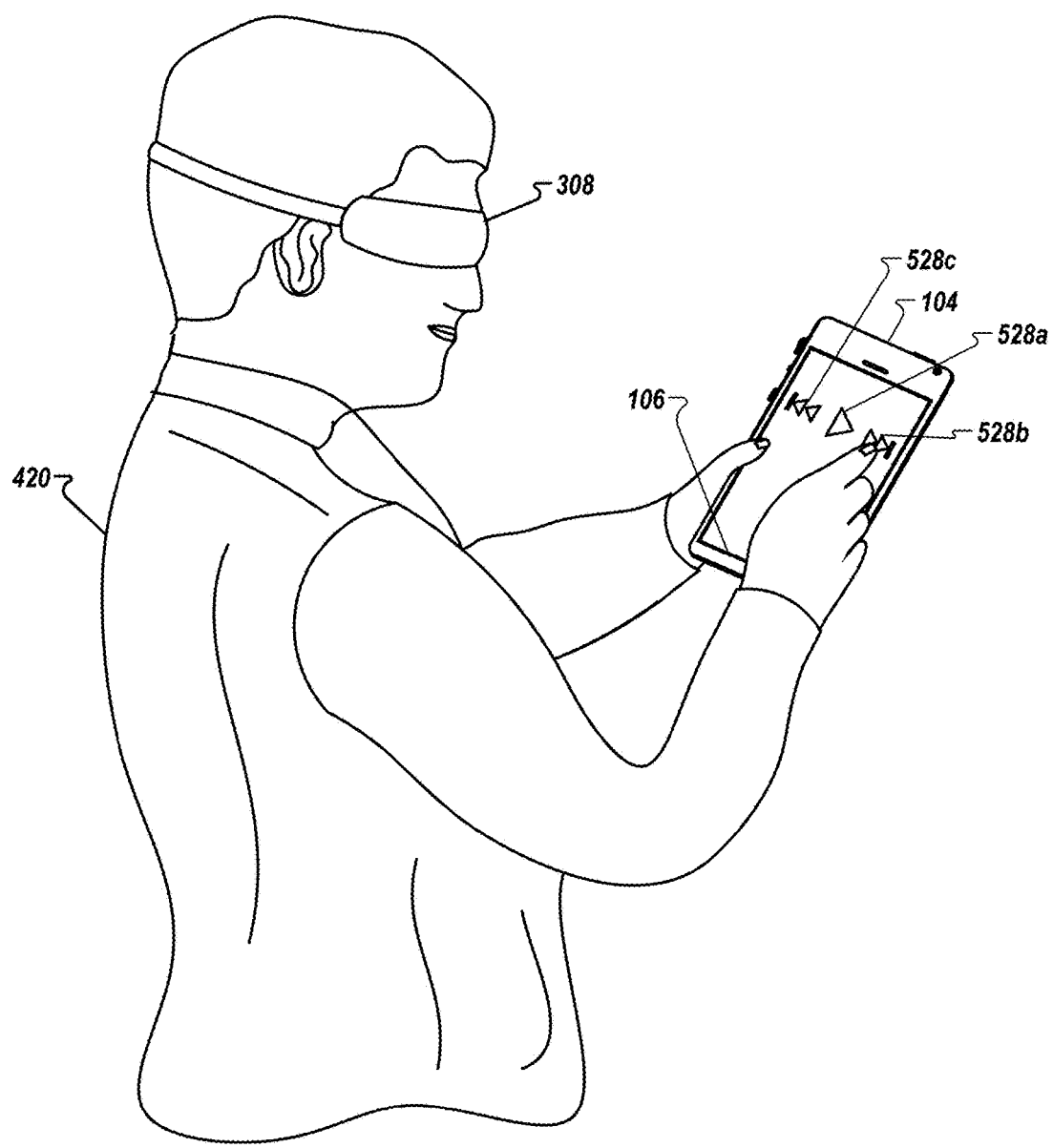
FIG. 5B is a diagram that illustrates the user as they are viewing the second image on the screen of the VR headset.

FIG. 5A is a diagram that illustrates an alternate image 500 that a user can view on a screen of a VR headset (e.g., the VR headset 308 as shown in FIGS. 3A-C). FIG. 5B is a diagram that illustrates the user 420 as they are viewing the image 500. The image 500 includes a rendering 524 of a hand and fingers of the user 420 holding a rendering 526 of the mobile computing device 104 as they are actually holding the mobile computing device 104 in front of the VR headset 380 as shown in FIG. 5B.

The VR application can display controls 528a-c on the display device 106 included on the mobile computing device 104. In some cases, the display device 106 can be a touchscreen. The VR application can then render the controls 528a-c as rendered controls 530a-c on the rendered computing device 526. In the examples shown in FIGS. 4A-B and 5A-B, the user 420, while projected into the VR space of a movie, can touch (contact, tap) a fast forward icon 528b on a touchscreen of the mobile computing device 104. The touching (contacting, tapping) of the fast forward icon 528b can fast-forward the movie to the image 500. This interaction of the user 420 with the touchscreen of the mobile computing device 104 can be rendered in real-time in the VR space as shown in the image 400 and the image 500. The image 500 shows a rendered finger of the user 420 contacting a rendered fast forward icon 530b.

Referring to FIGS. 1, 2, 3A-C, 4A-B, and 5A-B, a user (e.g., the user 420) may decide to return to viewing content (e.g., the content 202) on the mobile computing device 104. For example, the user 420 can remove the VR headset 308 and can disconnect the VR headset 308 from the mobile computing device 104. The disconnecting of the VR headset 308 can cause the content to be displayed on the display device 106 on the mobile computing device 104, providing a continuity of viewing of content for the user 420. For example, the disconnecting of the VR headset 308 can cause the mobile computing device 104 to stop providing the content to the VR headset 308.

Figure 6A:
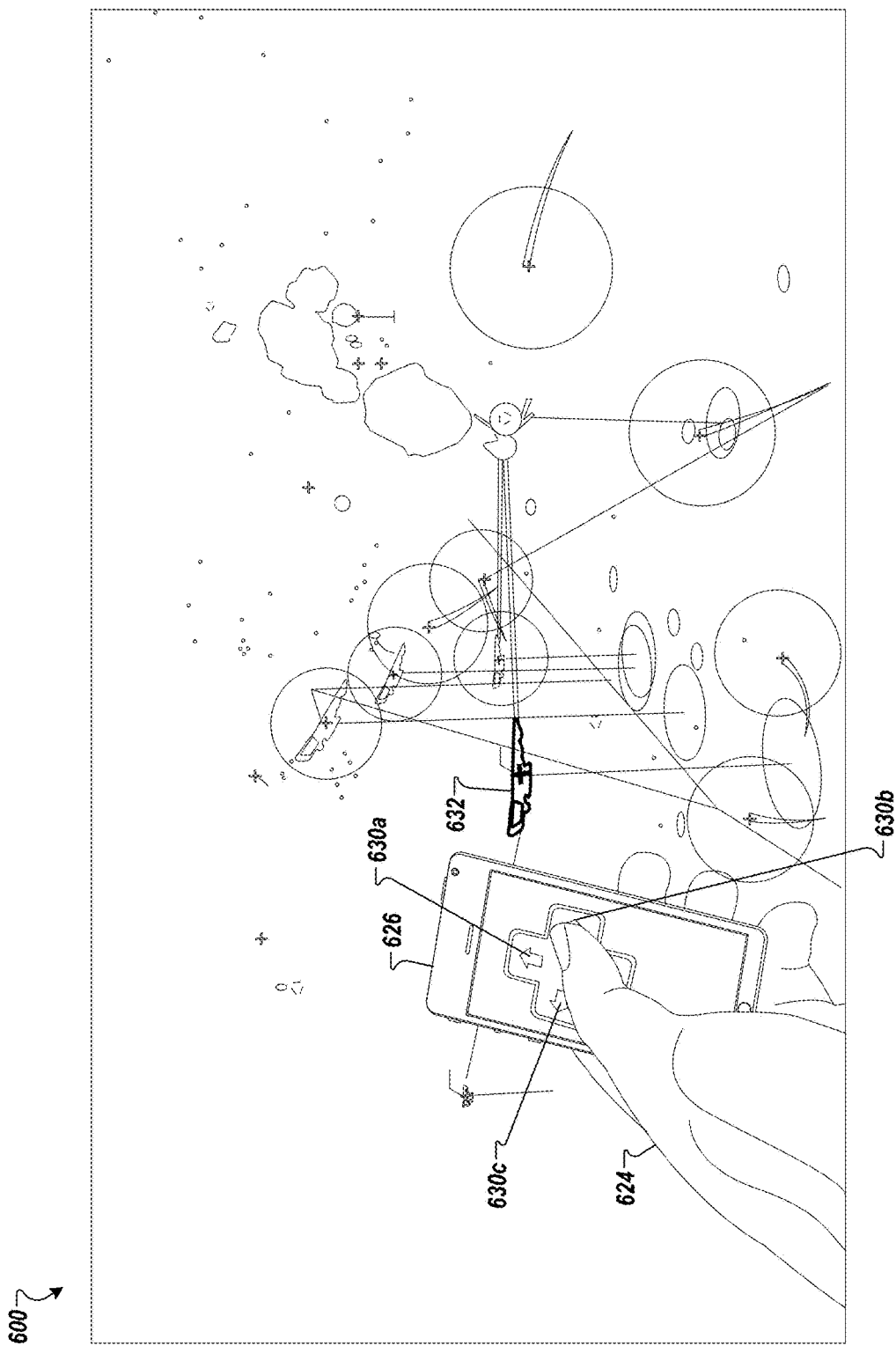
FIG. 6A is a diagram that illustrates a third image that a user can view on a screen of a VR headset.
Figure 6B:
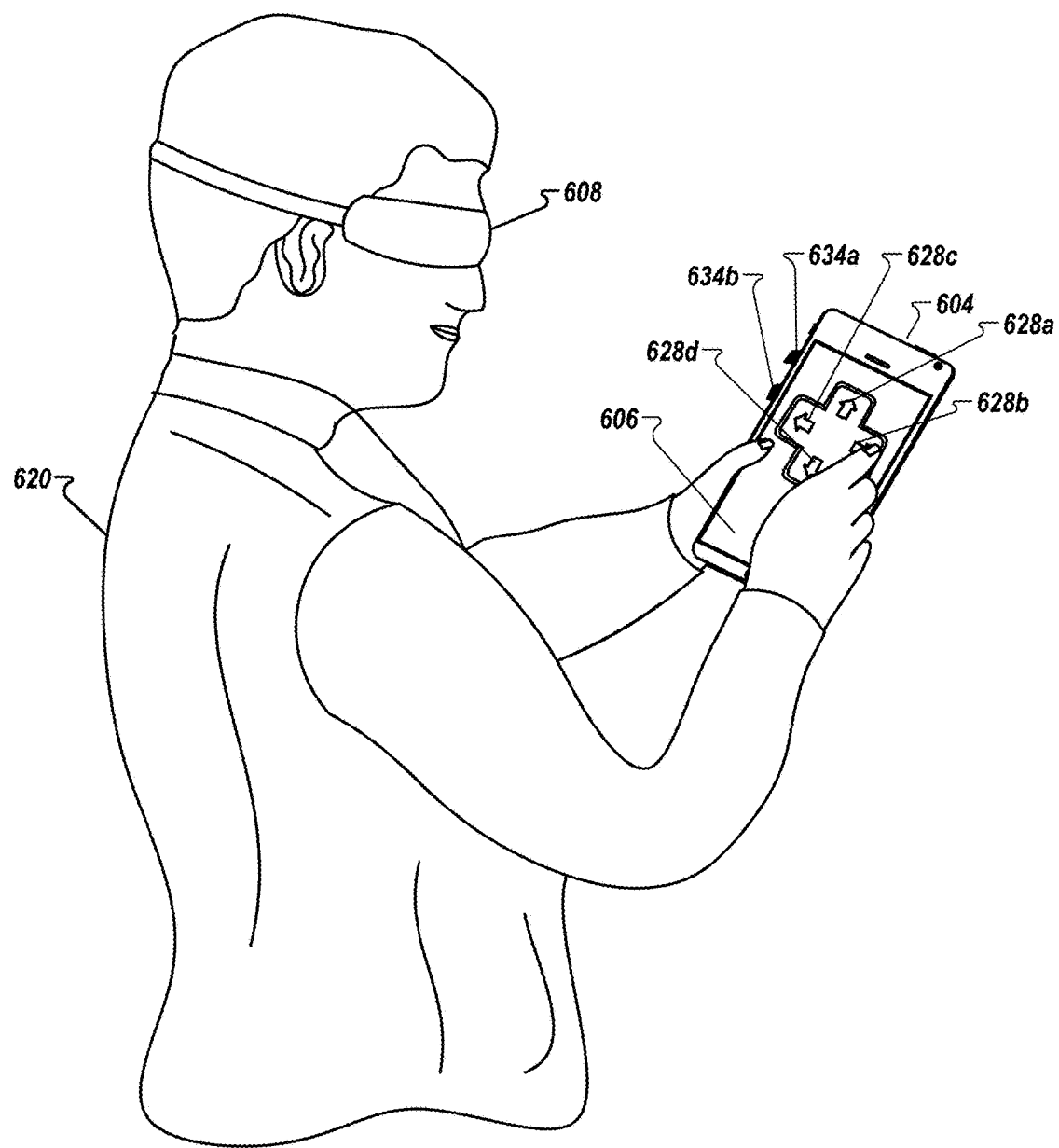
FIG. 6B is a diagram that illustrates a user as they are viewing third image on the screen of the VR headset.

FIG. 6A is a diagram that illustrates an image 600 that a user can view on the screen of a VR headset. FIG. 6B is a diagram that illustrates a user 620 as they are viewing the image 600. The user 620 can view the image 600 that includes content on the screen of a VR headset 608 while holding a mobile computing device 604 in front of the VR headset 608. For example, the image 600 projects the user into a VR space. The image 600 includes a rendering 624 of a hand and fingers of the user 620 holding a rendering 626 of the mobile computing device 604 as they are actually holding the mobile computing device 604 in front of the VR headset 608 as shown in FIG. 6B.

The rendering 624 of the hand and fingers of the user 620 and the rendering 626 of the mobile computing device 604 can be performed using one or more of the processes and methods described herein with reference to FIGS. 1, 2, 3A-C, 4A-B, and 5A-B.

In some implementations, the VR headset 608 can include hardware and software that can recognize, monitor, and track 3D movement of the mobile computing device 604 when the mobile computing device 604 is placed in front of or held within a range of positions relative to the VR headset 608. The VR headset 608 can provide the real-time position and orientation data to the VR application so that the VR application can render the mobile computing device 604 in real-time in the VR space in the detected position and orientation of the mobile computing device 604.

In the example shown in FIGS. 6A-B, the user 620 can be playing a video game and may be interacting in VR space as a fighter jet. The VR application can display controls 628a-d on a display device 606 included on the mobile computing device 604. The VR application can then render the controls 628a-d on the mobile computing device 604 as rendered controls 630a-d (please note that control 630d is located below the rendered finger (thumb) of the hand of the user (rendering 624)). For example, user interactions with the controls 628a-d can be translated into movements of a fighter jet 632 in the VR space.

For example, a user wearing the VR headset 608 can use eye tracking and head position to select an object in the VR space. Each of one or more buttons 634a-b on a side of the mobile computing device 604 can control the speed at which the object travels in the VR space. For example, pressing a first button 634a may increase the movement speed of the selected object and pressing a second button 634b may decrease the movement speed of the object. A user may press each button multiple times to control the increasing and decreasing speed of movement of the object in VR space. In some cases, the button may be rendered in VR space as a control knob that shows degrees of increasing and decreasing object speeds.

In some implementations, referring to FIGS. 1, 2, 3A-C, 4A-B, 5A-B, and 6A-B, a computing device (e.g., the mobile computing device 104) can include a screen or display device (e.g., the display device 106) that can display information, images, text, and data. The mobile computing device 104 can be rendered in VR space displaying the information on the rendered screen of the mobile computing device 104. In some implementations, dependent on the size of the text included in the display information, a user may need to zoom-in on information displayed on the screen of the computing device when in the VR space in order to have the rendered information displayed on the screen be legible in the VR space. For example, the user may zoom-in by moving the mobile computing device 104 closer to the VR headset. The user may zoom-out by moving the mobile computing device 104 farther from the VR headset. In another example, when the display device 106 is a touchscreen, the user may apply a particular touch action or gesture to zoom-in on information displayed on the display device 106.

In some implementations, referring to FIGS. 1, 2, 3A-C, 4A-B, 5A-B, and 6A-B, a computing device (e.g., the mobile computing device 104) can include a screen or display device (e.g., the display device 106) that can display information, images, text, and data. A user may want to interact with the content displayed on the display device in the VR space. For example, the user can drag the content from the mobile computing device 104 to the VR space using a swiping motion or gesture.

In some implementations, referring to FIGS. 1, 2, 3A-C, 4A-B, 5A-B, and 6A-B, a user may interact with a computing device (e.g., the mobile computing device 104) to input text in a VR space. In some implementations, the user can interact with the computing device in a soft keyboard mode of operation. In some implementations, the computing device can include a keyboard and the user can interact with the keyboard in the VR space in order to enter text data into the VR space. In some implementations, a touchpad can be an input device that may be separate from the computing device. The touchpad can be rendered in VR space as a virtual or soft keyboard to enable a user interacting with the touchpad in VR space to enter text data. In some implementations, a keyboard (e.g., a mechanical keyboard) can be an input device that may be separate from the computing device. The keyboard can be rendered in VR space as a keyboard to enable a user interacting with the keyboard in VR space to enter text data.

Being able to render the mobile computing device 104 and the information included on the screen (e.g., the display device 106) of the mobile computing device 104 in VR space can allow the mobile computing device 104 to provide a secondary screen in the VR space. For example, a user may be playing a virtual reality game (as in the example shown in FIGS. 6A-B). The VR headset 608 can include a primary screen that displays, for example, the image 600 where the mobile computing device 604 is rendered as a secondary VR screen that may display, for example, a list of inventory items for the game. In another example, a user may be watching a movie (as in the example shown in FIGS. 4A-B). The VR headset 308 can include a primary screen that displays, for example, the image 400 where the mobile computing device 104 is rendered as a secondary VR screen that may display, for example, information about the movie the user is watching.

Referring to FIGS. 6A-B, a user (e.g., the user 620) may decide to return to viewing content (e.g., playing a video game) on the mobile computing device 604. For example, the user 620 can remove the VR headset 608 and can disconnect the VR headset 608 from the mobile computing device 604. The disconnecting of the VR headset 608 can cause the content (e.g., the video game) to be displayed on the display device 606 on the mobile computing device 604, providing a continuity of viewing of content for the user 620.

Figure 7A:
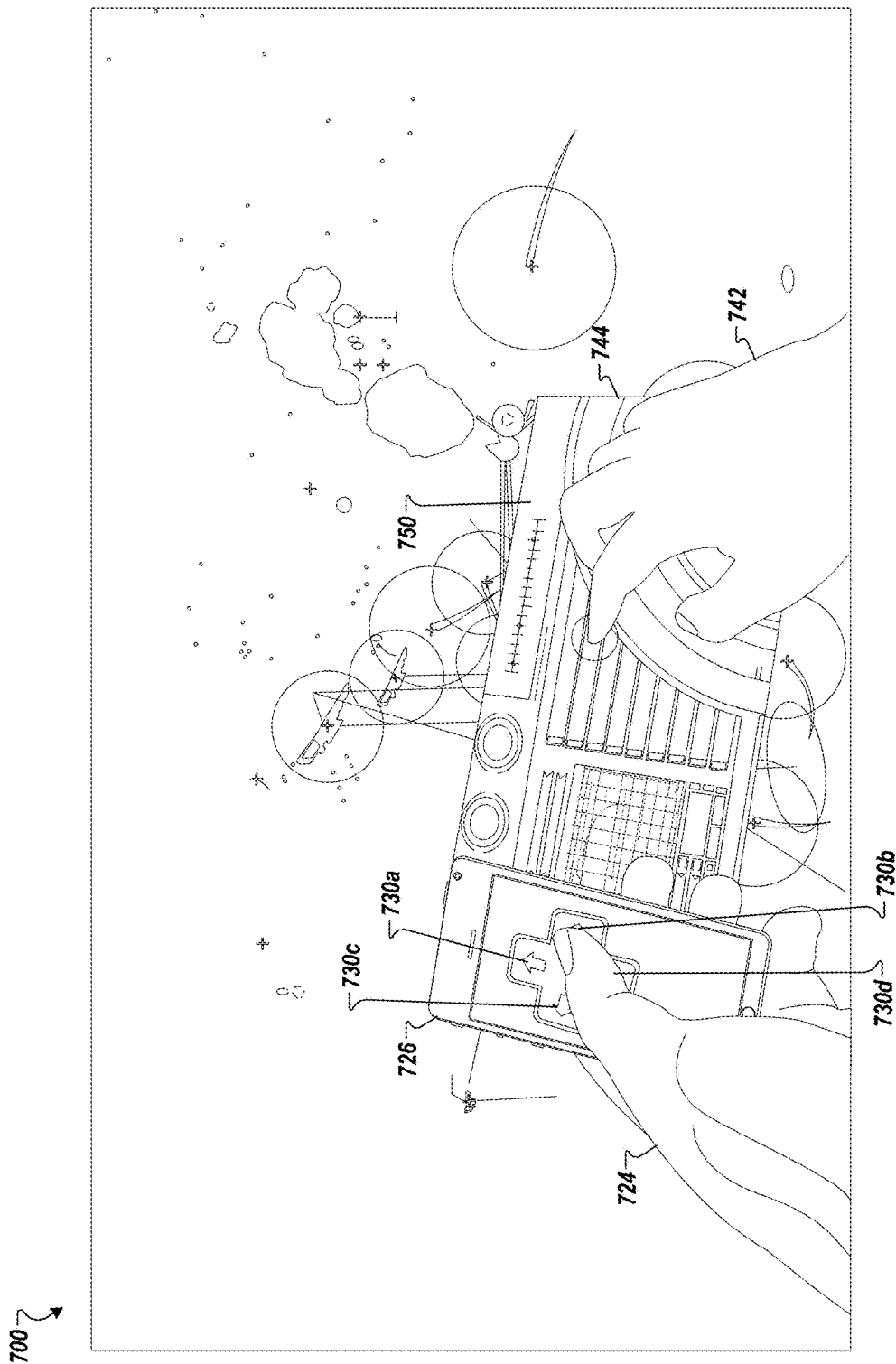
FIG. 7A is a diagram that illustrates a fourth image that a user can view on a screen of a VR headset.

FIG. 7A is a diagram that illustrates an image 700 that a user can view on the screen of a VR headset. FIG. 7B is a diagram that illustrates a user 720 as they are viewing the image 700. The user 720 can view the image 700 that includes content on the screen of a VR headset 708 while placing a computing device 704 near, next to, or in proximity to a keyboard 740. In some implementations, the mobile computing device 704 can interface to and communicate with the keyboard 740 using one of the wireless communication protocols described herein. The mobile computing device 704 and the keyboard 740 can be placed in front of the VR headset 708. In some cases, the mobile computing device 704 can be docked to the keyboard 740.

For example, the image 700 projects the user into a VR space. The image 700 includes a rendering 724 of a first hand and fingers of the user 720 holding a rendering 726 of the mobile computing device 704 as they are actually holding/interacting with the mobile computing device 704 in front of the VR headset 708 as shown in FIG. 7B. The image 700 also includes a rendering 742 of a second hand and fingers of the user 720 interacting with a rendering 744 of the keyboard 740 as, for example, a control panel 750.

In the example shown in FIGS. 7A-B, the rendering 724 of the first hand and fingers of the user 720 and the rendering 726 of the mobile computing device 704 and the rendering 742 of the second hand and fingers of the user 720 and the rendering 744 of the keyboard 740 can be performed using one or more of the processes and methods described herein with reference to FIGS. 1, 2, 3A-C, 4A-B, 5A-B, and 6A-B.

The user 720 can interact with the mobile computing device 704 and the keyboard 740 when controlling actions performed in the VR space. For example, the keyboard 740 can be rendered in VR space as VR controls or the control panel 750 that would be displayed in the cockpit of an airplane. The user 720 may interact with the mobile computing device 704 in the VR space by moving, rotating, and/or waving around the mobile computing device 704 to otherwise further control the movement of the airplane in the VR space.

The VR application can render the controls 728*a-d* on the mobile computing device 704 as rendered controls 730*a-d* (please note that control 730*d* is located below the rendered finger (thumb) of the hand of the user (rendering 724)). For example, user interactions with the controls 728*a-d* can be translated into movements of a fighter jet in the VR space. In addition or in the alternative, the VR application can render the keyboard 740 as rendered controls 744 in the control panel 750. For example, user interactions with the rendered controls 744 can be translated into the controlling of the functions of a fighter jet in the VR space.

In some implementations, one or more functions of a computing device (e.g., the mobile computing devices 104, 604, and 704) can be implemented in the VR space. For example, a computing device may include a camera. The rendered computing device in the VR space can be used as a camera, taking screen shots of the activity in the VR space. For example, when the user initiates the taking of the picture (a screen shot of what the user may be viewing on a screen of a VR headset), the VR application implements a capturing of the data being displayed on the screen of the VR headset. For example, the user can initiate the taking of the picture by pressing a virtual button (a button rendered in the VR space).

In some implementations, a user may be interacting with an online shopping web site in the VR space. The user can select an item for purchase. A VR application can render a computing device as the item in the VR space. A user interact with the computing device in the VR space by moving and rotating the computing device, allowing the user to see in the VR space various different views, sides, and aspects of the item.

In some implementations, a user may interact with a computing device in the VR space in the same way that they may interact with the computing device in non-VR space (e.g., in a standard, typical way). For example, the user may use an application on the computing device in VR space as they would normally use the same application in non-VR space.

In some implementations, a computing device can be rendered in a VR space in its entirety. In some implementations, certain aspects of a computing device can be rendered in a VR space. For example, a touch surface of a touchscreen of the computing device may be rendered in a VR space. In another example, a border of the computing device may be rendered in a VR space. In another example, an interface for the computing device (e.g., input controls) may be rendered in a VR space.

Though the examples shown in FIGS. 4A-B, 5A-B, 6A-B, and 7A-B show the mobile computing devices 104, 604 not tethered to the VR headsets 308, 608, respectively, using a cable, in some implementations the mobile computing devices 104, 604 may be tethered to the VR headsets 308, 608, respectively, using a cable.

As shown in the figures and examples included herein, a mobile computing device can be interfaced to/connected to a VR headset. In some implementations, the mobile computing device can execute a VR application and, in addition, the mobile computing device can interface with a computer-generated, 3D environment in a VR space. A user can hold the VR headset over the eyes of the user with one hand and hold the mobile computing device in another hand. Alternatively, a user can put on the VR headset using a strap attached to the VR headset and placed around a head of a user to hold the VR headset in place over the eyes of the user. This frees up one hand of the user. The user can be mobile while experiencing and interacting with a VR space. In some other situations, an additional computing system that is not mobile may be needed to execute the VR application and interface with the VR headset, limiting the movement of the user when experiencing and interacting with a VR space.

Figure 8A:
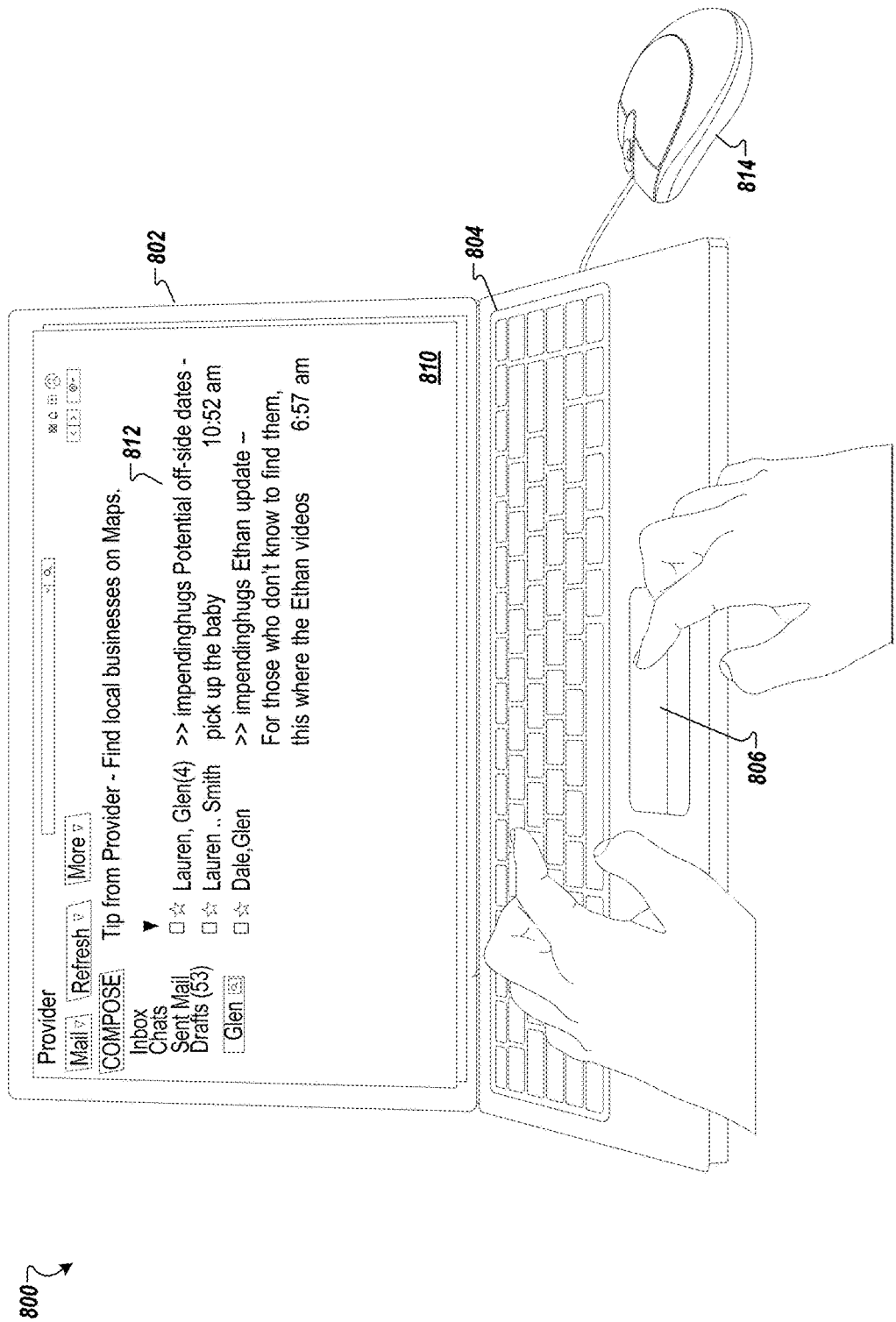
FIG. 8A is a diagram that illustrates a user interacting with a computing system.

FIG. 8A is a diagram that illustrates a user interacting with a computing system 800. For example, the computing system 800 can include a laptop computing device 802 that includes a keyboard 804, a trackpad 806, and a mouse 814. In the computing system 800, the mouse 814 is external to the laptop computing device 802. The laptop computing device 802 includes a display device 810 that displays information 812 (e.g., email messages) in an email application executing on the laptop computing device 802.

Figure 8B:
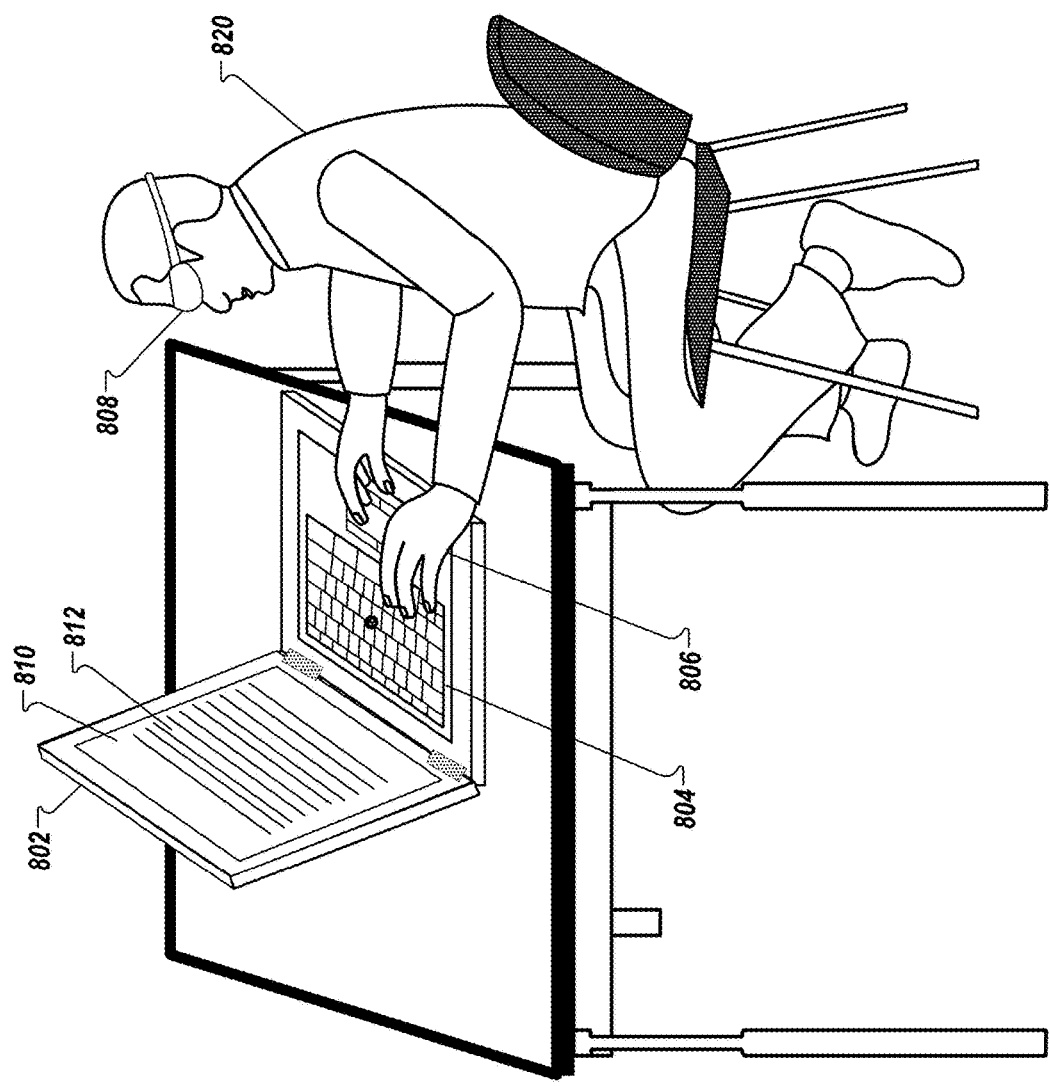
FIG. 8B is a diagram that illustrates a user as they are viewing a laptop computing device.

FIG. 8B is a diagram that illustrates a user 820 as they are viewing the laptop computing device 802. The user 820 can view the laptop computing device 802 on a screen of a VR headset 808 while interacting with the keyboard 804 and the trackpad 806. The VR headset 808 can be connected to/interfaced to the laptop computing device 802 using one or more of the wired and/or wireless communication interfaces described herein.

Figure 8C:
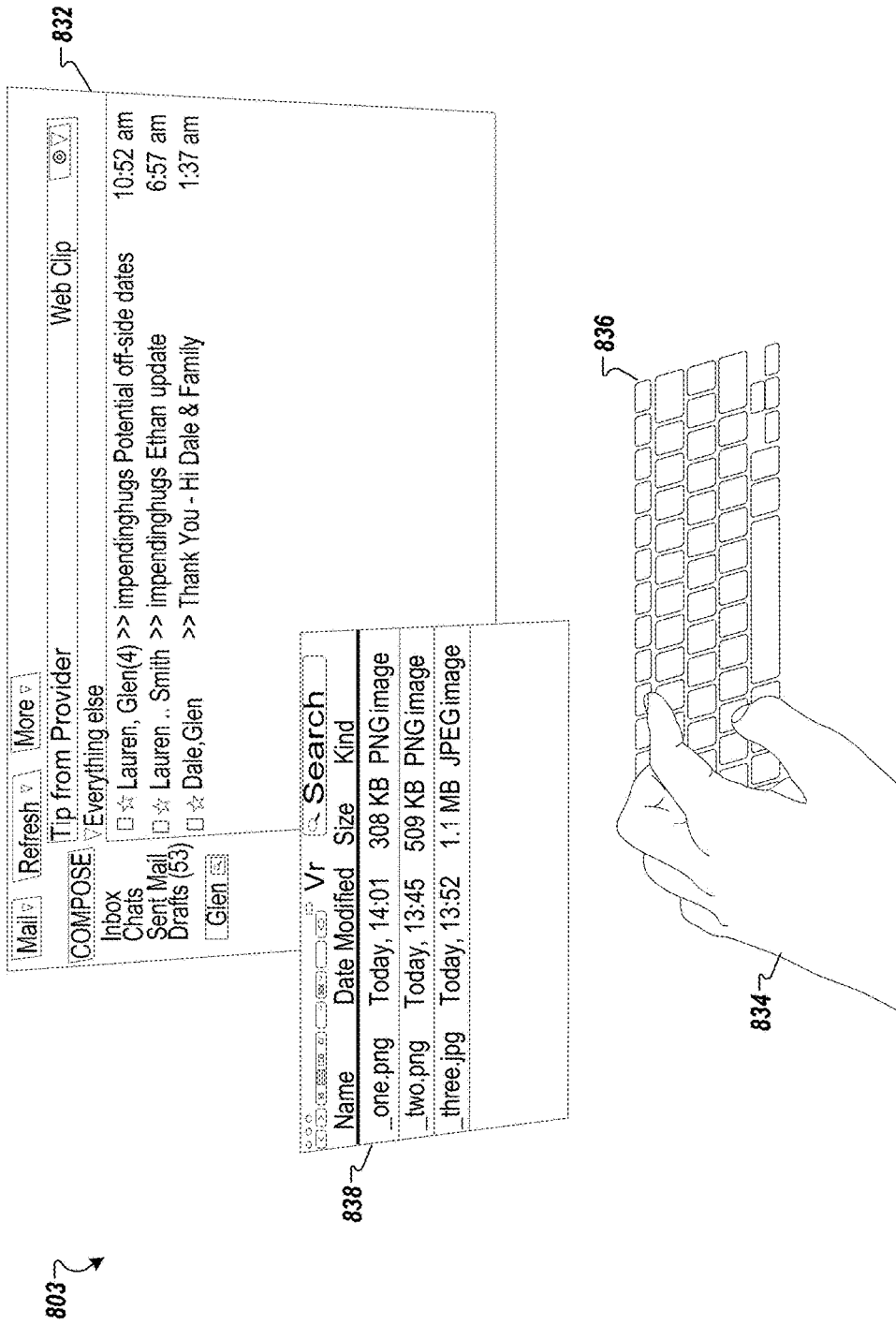
FIG. 8C is a diagram that illustrates a fifth image that a user can view on a screen of a VR headset.

FIG. 8C is a diagram that illustrates an image 803 that the user 820 can view on a screen of the VR headset 808. For example, the image 803 projects the user into a VR space. The image 803 includes a rendering 832 of the information 812 displayed on the display device 810 and a rendering 834 of a hand and fingers of the user 820 interacting with a rendering 836 of the keyboard 804. In addition, other windows that may be alternately displayed on the display device 810 as the user 820 interacts with the laptop computing device 802 may be rendered (e.g., rendered window 838) and presented to the user 820 in VR space along with the rendering 832 of the information 812 as displayed on the display device 810.

Figure 8D:
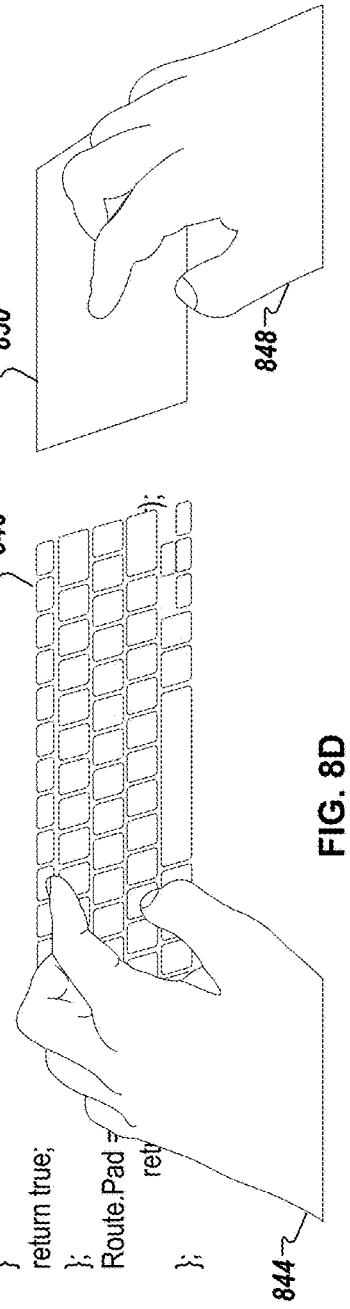
FIG. 8D is a diagram that illustrates a sixth image that a user can view on a screen of a VR headset.

FIG. 8D is a diagram that illustrates an image 840 that the user 820 can view on a screen of the VR headset 808. For example, the image 840 projects the user into a VR space. The image 840 includes a rendering 842 of information that can be displayed on the display device 810 and a rendering 844 of a first hand and fingers of the user 820 interacting with a rendering 846 of the keyboard 804. The image 840 includes a rendering 848 of a second hand and fingers of the user 820 interacting with a rendering 850 of the trackpad 806.

In the example shown in FIGS. 8C-D, the renderings 832, 834, 836, 838, 842, 844, 846, and 850 can be performed using one or more of the processes and methods described herein with reference to FIGS. 1, 2, 3A-C, 4A-B, 5A-B, 6A-B, and 7A-B. The user 820 can interact with the laptop computing device 802 and specifically the keyboard 804 and the trackpad 806 when controlling actions performed in the VR space.

Figure 9:
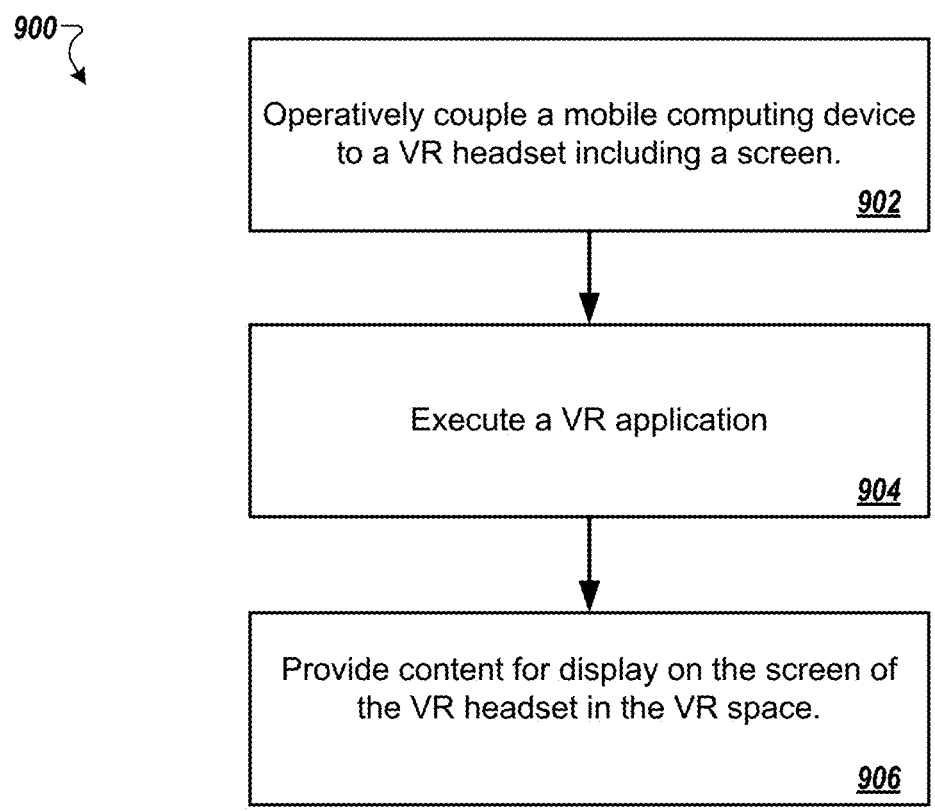
FIG. 9 is a flowchart that illustrates a method for interfacing a computing device in a computer-generated, 3D environment (a VR space).

FIG. 9 is a flowchart that illustrates a method 900 for interfacing a computing device in a computer-generated, 3D environment (a VR space). In some implementations, the systems, methods, and processes described herein can implement the method 900. For example, the method 900 can be described referring to FIGS. 1, 2, 3A-C, 4A-B, 5A-B, 6A-B, 7A-B, and 8A-D.

A mobile computing device is operatively coupled to a VR headset including a screen (block 902). For example, referring to FIG. 3A, the mobile computing device 104 can be connected to/interfaced with the VR headset 308 using the cable 316. The mobile computing device can execute a VR application (block 904). For example, referring to FIGS. 4A-B, the mobile computing device 104 can execute/run/play a movie in a VR space. The mobile computing device can display content on the screen of the VR headset in the VR space (block 906). For example, referring to FIGS. 4A-B, the image 400 can be displayed on a screen of the VR headset 308.

Figure 10:
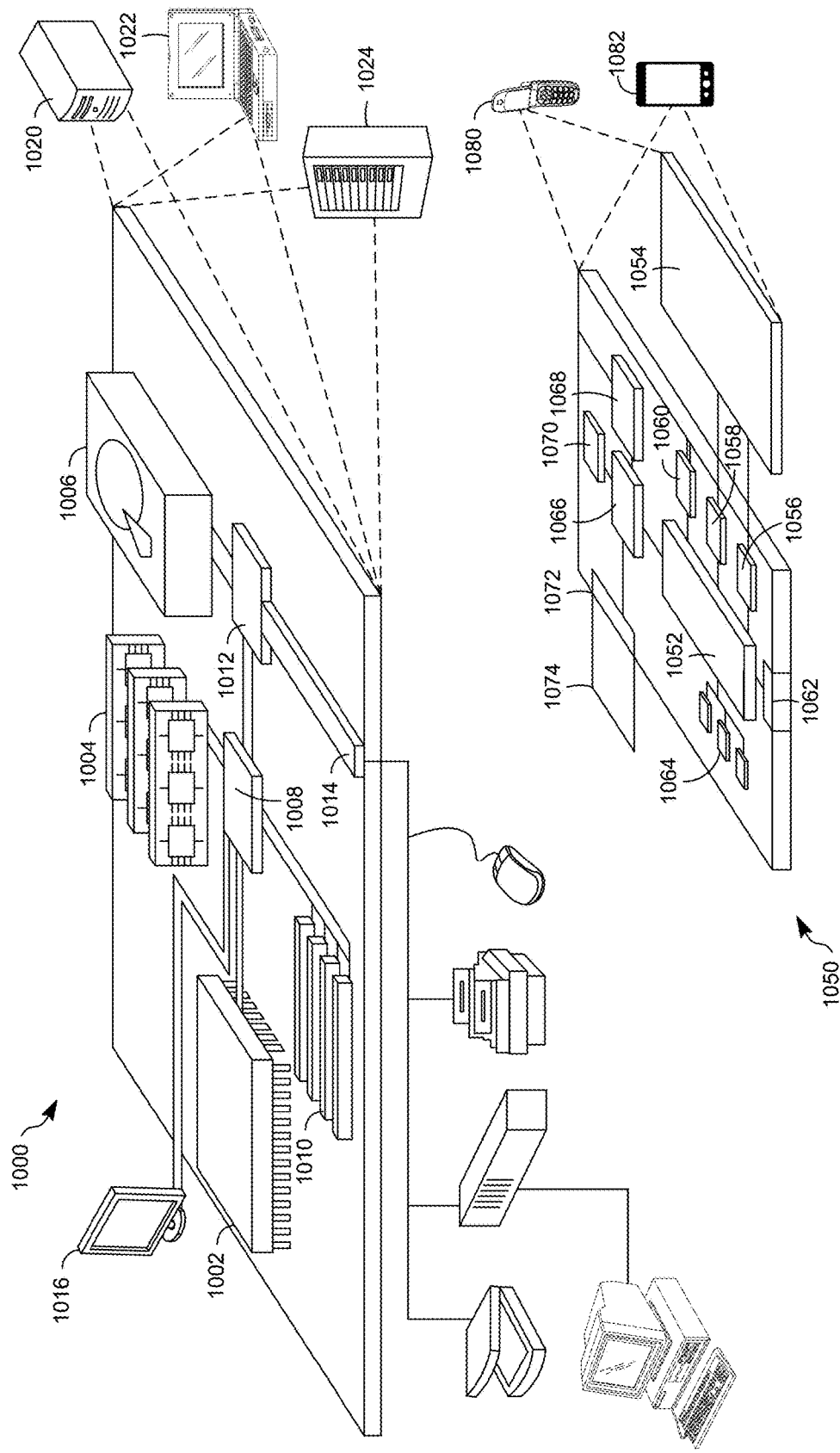
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system for providing a virtual reality (VR) space comprising:
   a mobile computing device including a touchscreen including a plurality of infrared (IR) pixels embedded within the touchscreen; and
   a VR headset operatively coupled to the mobile computing device, the VR headset including a screen and an infrared (IR) sensor configured to detect output from the plurality of IR pixels;
   the mobile computing device being configured to:
      execute a VR application; and
      provide content for display on the screen of the VR headset in the VR space.

2. The system of claim 1, wherein the mobile computing device is coupled to the VR headset using a tethered wired connection.

3. The system of claim 2, wherein the tethered wired connection includes a shape sensing cable configured to determine a position of the mobile computing device.

4. The system of claim 1, wherein the mobile computing device is coupled to the VR headset using a wireless connection.

5. The system of claim 1, wherein the VR headset includes another mobile computing device.

6. The system of claim 5,
   wherein a display device included in the other mobile computing device included in the VR headset is the screen, and
   wherein the other computing device is configured to render the provided content for display on the display device.

7. The system of claim 1, wherein the VR headset further includes a position detection device configured to determine a position of the mobile computing device.

8. The system of claim 7, wherein the position detection device is a camera.

9. The system of claim 8,
   wherein the mobile computing device is further configured to display a Quick Response (QR) code on the touchscreen, and
   wherein the camera detects an orientation of a QR code displayed on the touchscreen of the mobile computing device.

10. The system of claim 1,
    wherein the VR application determines a position of the mobile computing device based on detecting output from the plurality of IR pixels.

11. A method for providing a virtual reality (VR) space comprising:
    operatively coupling a mobile computing device including a touchscreen including a plurality of infrared (IR) pixels embedded within the touchscreen to a VR headset including a screen and an infrared (IR) sensor configured to detect output from the plurality of IR pixels;
    executing, by the mobile computing device, a VR application, the VR application determining a position of the mobile computing device based on the output from the plurality of IR pixels as detected by the IR sensor; and
    providing, by the mobile computing device, content for display on the screen of the VR headset in the VR space.

12. The method of claim 11, further comprising:
    rendering an aspect of the mobile computing device for inclusion in the VR space based on a detected position of the mobile computing device; and
    integrating the rendered aspect of the mobile computing device with the content for display on the screen of the VR headset.

13. The method of claim 11, further comprising:
    detecting an interaction of a user with the mobile computing device; and
    altering the content for display on the screen of the VR headset based on the detected interaction.

14. The method of claim 11, wherein providing content for display on the screen of the VR headset in the VR space comprises:
    rendering, by the mobile computing device, an aspect of the mobile computing device for inclusion in the VR space; and
    integrating the rendered aspect of the mobile computing device with content for display as integrated content in the VR space, wherein the rendered aspect of the mobile computing device is different from content displayed on a display device included in the mobile computing device.

15. A non-transitory, machine-readable medium having instructions stored thereon, the instructions, when executed by a processor, cause a mobile computing device to:
    operatively interface with a VR headset coupled to the mobile computing device that includes a plurality of infrared (IR) pixels, the VR headset including a screen and an infrared (IR) sensor configured to detect output from the plurality of IR pixels;
    execute a VR application, the VR application determining a position of the mobile computing device relative to the VR headset based on the output from the plurality of IR pixels as detected by the IR sensor; and
    provide content for display on the screen of the VR headset in a virtual reality (VR) space.

16. The medium of claim 15, wherein the instructions, when executed by a processor, further cause the mobile computing device to:

render an aspect of the mobile computing device for inclusion in the VR space based on a detected position of the mobile computing device; and integrate the rendered aspect of the mobile computing device with the content for display on the screen of the VR headset.

17. The medium of claim 15, wherein the instructions, when executed by a processor, further cause the mobile computing device to:

detect an interaction of a user with the mobile computing device; and alter the content for display on the screen of the VR headset based on the detected interaction.

\* \* \* \* \*